(12) United States Patent
Furutani et al.

(10) Patent No.: US 11,728,491 B2
(45) Date of Patent: Aug. 15, 2023

(54) SHEET-TYPE CELL AND PATCH

(71) Applicant: Maxell, Ltd., Kyoto (JP)

(72) Inventors: Takahiro Furutani, Otokuni-gun (JP);
Yasuhiro Naka, Otokuni-gun (JP);
Hiroaki Ono, Otokuni-gun (JP);
Mitsutoshi Watanabe, Otokuni-gun (JP)

(73) Assignee: Maxell, Ltd., Kyoto (JP)

( * ) Notice: Subject to any disclaimer, the term of this patent is extended or adjusted under 35 U.S.C. 154(b) by 203 days.

(21) Appl. No.: 16/975,031

(22) PCT Filed: Mar. 13, 2019

(86) PCT No.: PCT/JP2019/010281
§ 371 (c)(1),
(2) Date: Aug. 21, 2020

(87) PCT Pub. No.: WO2019/177025
PCT Pub. Date: Sep. 19, 2019

(65) Prior Publication Data
US 2021/0091385 A1    Mar. 25, 2021

(30) Foreign Application Priority Data

Mar. 16, 2018  (JP) ................. 2018-049376
Mar. 23, 2018  (JP) ................. 2018-056871
Apr. 5, 2018   (JP) ................. 2018-072968

(51) Int. Cl.
*H01M 4/86*     (2006.01)
*H01M 50/138*   (2021.01)
(Continued)

(52) U.S. Cl.
CPC ......... *H01M 4/8605* (2013.01); *H01M 12/06* (2013.01); *H01M 50/103* (2021.01);
(Continued)

(58) Field of Classification Search
CPC .. H01M 4/8605; H01M 12/06; H01M 50/103; H01M 50/121; H01M 50/1385;
(Continued)

(56) References Cited

U.S. PATENT DOCUMENTS

2004/0241537 A1    12/2004  Okuyama et al.
2007/0077485 A1*   4/2007   Takamura ......... H01M 50/1385
                                                429/534
(Continued)

FOREIGN PATENT DOCUMENTS

JP    2004-288571 A    10/2004
JP    2004-319464 A    11/2004
(Continued)

OTHER PUBLICATIONS

International Search Report (PCT/ISA/210) issued in PCT/JP2019/010281, dated Jun. 18, 2019.
(Continued)

*Primary Examiner* — Stewart A Fraser
(74) *Attorney, Agent, or Firm* — Birch, Stewart, Kolasch & Birch, LLP

(57) ABSTRACT

Provided is a sheet-type cell with excellent reliability. The sheet-type cell of the present invention includes power generation elements, including a positive electrode, a negative electrode, a separator, and an electrolyte solution, and a sheet-type outer case made of a resin film in which the power generation elements are contained. The electrolyte solution is an aqueous electrolyte solution. The resin film has an electrically insulating moisture barrier layer. The sheet-type cell is a primary cell. The moisture barrier layer of the resin film is preferably composed of at least an inorganic oxide. The pH of the electrolyte solution is preferably 3 or more and less than 12.

18 Claims, 9 Drawing Sheets

(51) Int. Cl.
*H01M 50/121* (2021.01)
*H01M 50/103* (2021.01)
*H01M 12/06* (2006.01)
*H01M 50/105* (2021.01)
*H01M 50/141* (2021.01)

(52) U.S. Cl.
CPC ....... *H01M 50/105* (2021.01); *H01M 50/121* (2021.01); *H01M 50/1385* (2021.01); *H01M 50/141* (2021.01); *H01M 2004/8689* (2013.01); *H01M 2220/30* (2013.01)

(58) Field of Classification Search
CPC ..... H01M 2004/8689; H01M 2220/30; H01M 50/1243; H01M 50/131; H01M 50/145; H01M 6/14
See application file for complete search history.

(56) References Cited

U.S. PATENT DOCUMENTS

2010/0112454 A1* 5/2010 Visco ................. H01M 50/463
429/246
2014/0162108 A1* 6/2014 Visco ..................... H01M 4/13
429/131
2014/0308580 A1 10/2014 Yamada
2018/0062146 A1* 3/2018 Asano ................ H01M 50/133
2018/0166665 A1* 6/2018 Audebert ............ H01M 50/116
2018/0366692 A1* 12/2018 Ueda .................. H01M 50/133

FOREIGN PATENT DOCUMENTS

| JP | 2006-19246 A | 1/2006 |
| JP | 2013-48042 A | 3/2013 |
| JP | 2013-180473 A | 9/2013 |
| JP | 2015-103399 A | 6/2015 |
| JP | 2015-201387 A | 11/2015 |
| JP | 2017-212179 A | 11/2017 |
| JP | 2018-32547 A | 3/2018 |

OTHER PUBLICATIONS

Extended European Search Report for corresponding European Application No. 19768095.2. dated Mar. 19, 2021.

* cited by examiner (a)

(b)

(c)

(d)

(e)

(f)

(g)

(h)

SHEET-TYPE CELL AND PATCH

TECHNICAL FIELD

The present application relates to a sheet-type cell with excellent reliability and a patch that uses the sheet-type cell.

BACKGROUND ART

In recent years, there is a growing demand for a sheet-type cell having a sheet-type outer case that includes a resin film as a constituent material. Such a sheet-type cell covers a wide range of applications, including the use of large cells, e.g., for power sources of industrial devices and the use of small cells, e.g., for power sources of electronic devices such as smartphones.

The resin film constituting the outer case of the sheet-type cell is typically a laminated film of metal foil such as aluminum and a thermoplastic resin (see Patent Document 1). Moreover, a film including a gas barrier layer composed of, e.g., metal oxide has been proposed as an outer case of a secondary cell or a cell containing a solid electrolyte (see Patent Documents 2, 3).

PRIOR ART DOCUMENTS

Patent Documents

Patent Document 1: JP 2004-319464 A
Patent Document 2: JP 2013-180473 A
Patent Document 3: JP 2015-201387 A

DISCLOSURE OF INVENTION

Problem to be Solved by the Invention

When a cell has an outer case of a laminated film including an aluminum layer and a resin layer, the outer case is usually sealed by thermal fusion of a thermoplastic resin contained in the resin layer that is formed on the aluminum layer. In this case, if the thermal fusion is performed under severe conditions with emphasis on the sealing properties, the thermoplastic resin can flow so that the aluminum layer is exposed. Consequently, the exposed aluminum layer may come into contact with, e.g., an electrode or a terminal for connecting the electrode to an external device and may cause a short circuit.

As described in Patent Document 3, when an outer case includes a gas barrier layer composed of an electrical insulating material, it is easier to ensure the insulation properties, as compared to the use of a metal foil layer as the gas barrier layer. Thus, the fusion conditions for the outer case can be set without much consideration of the insulation properties.

However, a secondary cell having an aqueous electrolyte solution such as a nickel-metal hydride storage cell or a lead storage cell produces a large amount of hydrogen gas or oxygen gas from the electrode during charging or overcharging. This may pose some problems when the secondary cell uses a flexible outer case member including a gas barrier layer. For example, the outer case member may swell and damage the device because the internal pressure of the secondary cell is increased by the gas generated during charging. Moreover, the sealed portion of the outer case member may be broken due to the internal pressure, resulting in leakage of the electrolyte solution.

On the other hand, when the sheet-type cell is an air cell, the resin film constituting the outer case has air holes through which air is taken into the cell, and thus the gas inside the cell can be released relatively easily to the outside of the cell system. However, in the air cell of Patent Document 1, the air holes are sealed with a non-porous oxygen-permeable polymer membrane. Such a configuration can prevent, e.g., the dissipation of a solvent contained in the electrolyte solution, but may also interfere with the introduction of air (oxygen) required for the reaction. Thus, it is likely that the reliability of the cell will be reduced, e.g., since the cell is not easily operated.

The invention disclosed in the present application has been made in view of the circumstances of the conventional sheet-type cells, as described above. The first object of the present invention is to provide a highly reliable sheet-type cell that uses a flexible outer case member including a gas barrier layer. The second object of the present invention is to provide a highly reliable sheet-type cell that is an air cell having a sheet-type outer case made of a resin film.

Further, it is an object of the present invention to provide a patch that can be operated stably.

Means for Solving Problem

A first sheet-type cell disclosed in the present application includes power generation elements, including a positive electrode, a negative electrode, a separator, and an electrolyte solution, and a sheet-type outer case made of a resin film in which the power generation elements are contained. The electrolyte solution is an aqueous electrolyte solution. The resin film has an electrically insulating moisture barrier layer. The first sheet-type cell is a primary cell.

A second sheet-type cell disclosed in the present application is an air cell that includes power generation elements, including a positive electrode, a negative electrode, a separator, and an electrolyte solution, and a sheet-type outer case made of a resin film in which the power generation elements are contained. The positive electrode is located on one side of the outer case and the negative electrode is located on the other side of the outer case. The positive electrode has a catalyst layer containing a catalyst. One or more air holes are formed in the side of the outer case where the positive electrode is provided. Each air hole has an area of 0.002 $mm^2$ or more. The second sheet-type cell satisfies $0.0002 \le s/t \le 0.03$, where s represents a total area ($mm^2$) of the one or more air holes and t represents an area ($mm^2$) of the catalyst layer.

A patch disclosed in the present application is a wearable patch that is attached to the body and includes any of the sheet-type cells disclosed in the present application as a power source.

Effects of the Invention

The first sheet-type cell of the present disclosure includes the aqueous electrolyte solution and is configured as a primary cell. Thus, even if the outer case includes the resin film having the electrically insulating moisture barrier layer, it is possible to suppress an increase in the internal pressure caused by the gas generated in the cell. Therefore, the first sheet-type cell can have excellent reliability. The amount of gas generated in a primary cell due to, e.g., the corrosion of a negative electrode active material is smaller than that generated in a secondary cell. In particular, a hydrogen gas is able to pass through the inside of the sheet-type outer case and dissipate gradually. This can prevent the problems caused by an increase in the internal pressure of the cell.

The second sheet-type cell of the present disclosure is an air cell that has the sheet-type outer case made of the resin film. The area of each air hole formed in the side of the sheet-type outer case where the positive electrode is provided is set within a predetermined range. Moreover, the ratio of the total area of the air holes to the area of the catalyst layer is set within a predetermined range. This configuration can introduce air (oxygen) required for the reaction, prevent carbon dioxide from entering the cell through the air holes, and also reduce the dissipation of water contained in the electrolyte solution. Thus, both the discharge characteristics and the storage characteristics of the cell can be improved, so that the second sheet-type cell can have excellent reliability.

The patch of the present disclosure uses any of the sheet-type cells of the present disclosure having excellent operation reliability as a power source, and thus can perform the function stably.

DESCRIPTION OF THE INVENTION

Figure 1:
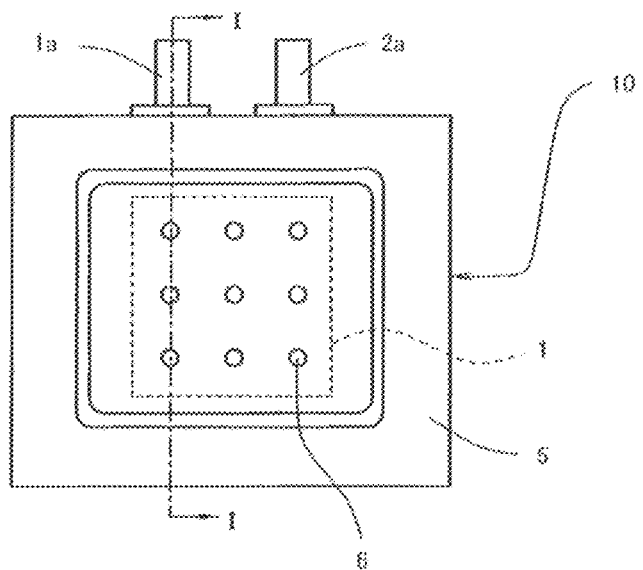
FIG. 1 is a plan view schematically illustrating an example of a sheet-type cell of the present disclosure.

A sheet-type cell of the present disclosure uses a sheet-type outer case made of a resin film as a cell container that contains power generation elements. Moreover, the resin film of the sheet-type outer case has an electrically insulating moisture barrier layer.

In the sheet-type cell of the present disclosure, the moisture barrier layer with electrical insulation properties is used for the resin film of the sheet-type outer case. This configuration can solve the problem of a short circuit that may occur when the sheet-type outer case is made of a metal laminated film (e.g., an aluminum laminated film) and the metal layer that functions as a moisture barrier layer is exposed in the cell, e.g., at the time of sealing. The metal laminated film has been generally used in the sheet-type cell including an electrolyte solution composed of an aqueous solution (i.e., an aqueous electrolyte solution). Thus, the sheet-type cell of the present disclosure can prevent a short circuit due to the contact of the sheet-type outer case with the electrode or the like, and can also reduce a change in the composition of the electrolyte solution due to the dissipation of water from the electrolyte solution to the outside of the cell. As a result, the sheet-type cell of the present disclosure has excellent reliability. Moreover, the sheet-type cell of the present disclosure can prevent the corrosion of the sheet-type outer case made of the metal laminated film (i.e., the exposed metal layer) that may occur due to the contact with the electrolyte solution.

The sheet-type cell of the present disclosure is configured as a primary cell and can suppress an increase in the internal pressure of the cell by using the resin film having the electrically insulating moisture barrier layer.

The resin film of the sheet-type outer case has the electrically insulating moisture barrier layer. The resin film may have either a single layer structure or a multilayer structure. The single layer structure includes an electrically insulating resin film that also serves as a moisture barrier layer. The multilayer structure includes a plurality of electrically insulating resin films, at least one of which serves as a moisture barrier layer. Alternatively, the multilayer structure may include a base material layer made of a resin film and an electrically insulating moisture barrier layer formed on the surface of the base material layer.

The preferred resin film has a structure in which the moisture barrier layer composed of at least an inorganic oxide is formed on the surface of the base material layer made of a resin film.

Examples of the inorganic oxide of the moisture barrier layer include aluminum oxide and silicon oxide. The moisture barrier layer composed of silicon oxide tends to be superior to that composed of aluminum oxide in the effect and function of suppressing the permeation of water contained in the electrolyte solution of the cell. For this reason, the inorganic oxide of the moisture barrier layer is more preferably silicon oxide.

The moisture barrier layer composed of the inorganic oxide can be formed on the surface of the base material layer by, e.g., an evaporation method. The thickness of the moisture barrier layer is preferably 10 to 300 nm.

Examples of the resin of the resin film that forms the base material layer include polyesters such as polyethylene terephthalate (PET), polyolefins such as polyethylene and polypropylene, polyamides such as nylon, polyimide, and polycarbonate. The thickness of the base material layer is preferably 5 to 100 μm.

When the resin film includes the moisture barrier layer and the base material layer, a protective layer for protecting the moisture barrier layer may be formed on the surface of the moisture barrier layer (which is opposite to the base material layer).

The sheet-type outer case is usually provided by arranging two resin films in layers or folding one resin film, and inserting the power generation elements (e.g., the electrodes and the electrolyte solution) between the resin films. Then, the resins of the upper and lower resin films are fused together, so that the sheet-type outer case is sealed by thermal fusion. Therefore, from the viewpoint of improving the sealing properties of the sheet-type outer case, the resin film preferably has a thermal fusion resin layer.

The thermal fusion resin layer may be formed on the surface of the resin film that is to be the inner surface of the cell. When the resin film includes the moisture barrier layer and the base material layer, the moisture barrier layer may be formed on one side of the base material layer and the thermal fusion resin layer may be formed on the other side of the base material layer. Alternatively, the moisture barrier layer may be formed on one side of the base material layer and the thermal fusion resin layer may be formed on the surface of the moisture barrier layer (which is opposite to the base material layer).

Examples of the thermal fusion resin of the thermal fusion resin layer include polyethylene such as linear low-density polyethylene, modified polyolefins (such as modified polyolefin ionomers), and polypropylene and copolymers thereof. The thickness of the thermal fusion resin layer is preferably 20 to 100 μm.

The total thickness of the resin film is preferably 10 μm or more in terms of, e.g., imparting sufficient strength to the sheet-type cell and 200 μm or less in terms of suppressing an increase in the thickness of the sheet-type cell and a decrease in the energy density of the sheet-type cell.

The moisture permeability of the resin film of the sheet-type outer case is preferably 10 g/m$^2$·24 h or less. It is desirable that the resin film is not permeable to moisture as much as possible. In other words, the moisture permeability of the resin film is preferably as small as possible and may be 0 g/m$^2$·24 h.

In the present specification, the moisture permeability of the resin film is a value measured by a method in accordance with JIS K 7129B.

The sheet-type cell of the present disclosure includes various types of primary cells having an electrolyte solution composed of an aqueous solution. When the sheet-type cell is an air cell, it is preferable that the resin film of the sheet-type outer case has some degree of oxygen permeability. The air cell is discharged by supplying air (oxygen) to the positive electrode. Therefore, the sheet-type outer case has air holes through which oxygen is introduced into the cell. If the resin film of the sheet-type outer case is permeable to oxygen, the oxygen can also be introduced into the cell through the portion of the sheet-type outer case other than the air holes. As a result, the oxygen can be supplied more uniformly over the entire positive electrode. Thus, the discharge characteristics of the cell can be improved and the discharge time can be made longer. Moreover, the sheet-type cell can have a sheet-type outer case without air holes.

When the sheet-type cell is an air cell, the specific oxygen permeability of the resin film of the sheet-type outer case is preferably 0.02 cm$^3$/m$^2$·24 h·MPa or more, and more preferably 0.2 cm$^3$/m$^2$·24 h·MPa or more. However, if the resin film of the sheet-type outer case allows too much oxygen to pass through it, self-discharge may occur, leading to the loss of capacity. Therefore, the oxygen permeability of the resin film is preferably 100 cm$^3$/m$^2$·24 h·MPa or less, and more preferably 50 cm$^3$/m$^2$·24 h·MPa or less.

On the other hand, when the sheet-type cell is a primary cell other than the air cell (as will be described in detail later), the oxygen permeability of the resin film of the sheet-type outer case is not particularly limited. However, it is preferable that the resin film is not much permeable to oxygen in terms of improving the storage characteristics of the cell. The specific oxygen permeability of the resin film is preferably 10 cm$^3$/m$^2$·24 h·MPa or less.

In the present specification, the oxygen permeability of the resin film is a value measured by a method in accordance with JIS K 7126-2.

With the configuration as specifically described above, the resin film can have a moisture permeability and an oxygen permeability that satisfy the above suitable values. It is also possible to use laminated films that are commercially available under the name of, e.g., barrier films for use in medical applications, electronic devices, food, etc.

The commercially available laminated films include, e.g., "GL FILM" and "PRIME BARRIER" (both are trade names) manufactured by Toppan Printing CO., LTD., "MAXBARRIER" and "TL" (both are trade names) manufactured by Mitsui Chemicals Tohcello, Inc., "TECHBARRIER" (trade name) manufactured by Mitsubishi Chemical Corporation, "IB-Film" (trade name) manufactured by Dai Nippon Printing Co., Ltd., and "ECOSYAL" (trade name) manufactured by TOYOBO CO., LTD.

The electrolyte solution of the sheet-type cell is an aqueous solution in which an electrolyte salt is dissolved. The aqueous solution used as the electrolyte solution is not particularly limited and may be a high-concentration alkaline electrolyte solution (pH: about 14) used for an alkaline dry cell. However, the pH of the electrolyte solution should be as close to neutral as possible in terms of reducing the environmental impact of the cell for disposal and ensuring the safety when the electrolyte solution leaks, e.g., due to damage to the outer case of the cell. Thus, the pH of the electrolyte solution is preferably 3 or more, and more preferably 5 or more. The pH of the electrolyte solution is also preferably less than 12, and more preferably 10 or less. The pH of the electrolyte solution is further preferably less than 7 in terms of, e.g., suppressing the corrosion of a negative electrode active material.

Examples of the electrolyte salt dissolved in the aqueous solution used as the electrolyte solution include the following: chlorides such as sodium chloride, potassium chloride, magnesium chloride, calcium chloride, ammonium chloride, and zinc chloride; hydroxides of alkali metals or alkaline-earth metals (e.g., lithium hydroxide, sodium hydroxide, potassium hydroxide, and magnesium hydroxide), acetates of alkali metals or alkaline-earth metals (e.g., sodium acetate, potassium acetate, and magnesium acetate), nitrates of alkali metals or alkaline-earth metals (e.g., sodium nitrate, potassium nitrate, and magnesium nitrate), sulfates of alkali metals or alkaline-earth metals (e.g., sodium sulfate, potassium sulfate, and magnesium sulfate), phosphates of alkali metals or alkaline-earth metal s (e.g., sodium phosphate, potassium phosphate, and magnesium phosphate), borates of alkali metals or alkaline-earth metals (e.g., sodium borate, potassium borate, and magnesium borate), citrates of alkali metal s or alkaline-earth metals (e.g., sodium citrate, potassium citrate, and magnesium citrate), and glutamates of alkali metals or alkaline-earth metals (e.g., sodium glutamate, potassium glutamate, and magnesium glutamate); hydrogencarbonates of alkali metals (e.g., sodium hydrogencarbonate and potassium hydrogencarbonate); percarbonates of alkali metals (e.g., sodium percarbonate and potassium percarbonate); compounds containing halogens such as fluorides; and polycarboxylic acids. The aqueous solution may contain either one or two or more of these electrolyte salts.

As the electrolyte salt contained in the electrolyte solution, salts of strong acids and weak bases are preferably used. The strong acids may be selected from hydrochloric acid, sulfuric acid, and nitric acid. The weak bases may be typified by ammonia and hydroxides of metallic elements such as aluminum hydroxide and magnesium hydroxide. Moreover, ammonium salts or salts of particular metallic elements are also preferred. Specifically, salts of at least one type of ions selected from $Cl^-$, $SO_4^{2-}$, $HSO_4^-$, and $NO_3^-$ and at least one type of ions selected from Al ions, Mg ions, Fe ions, and ammonium ions are more preferred. Examples of the salts include the following; ammonium salts such as ammonium sulfate, ammonium hydrogen sulfate (($NH_4$) $HSO_4$), ammonium chloride, and ammonium nitrate; aluminum salts such as aluminum sulfate, aluminum chloride, and aluminum nitrate;

magnesium salts such as magnesium sulfate, magnesium chloride, magnesium chloride hydroxide (MgCl(OH)), and magnesium nitrate; and iron salts such as iron (II) sulfate, iron (II) ammonium sulfate (($NH_4$)$_2$Fe($SO_4$)$_2$), iron (III) sulfate, iron (II) chloride, and iron (II) nitrate.

The negative electrode of the sheet-type cell includes a negative electrode active material that is usually a metal material such as metal or alloy. The electrolyte solution, which is the aqueous solution containing the above salts of strong acids and weak bases, has a relatively weak corrosive action on the metal material that can be a negative electrode active material, as compared to the electrolyte solution containing salts of strong acids and strong bases such as sodium chloride. Moreover, the electrolyte solution containing salts of metallic elements selected from Al, Mg, and Fe or ammonium salts have a relatively high conductivity, as compared to, e.g., an aqueous solution of zinc chloride. Thus, the use of the electrolyte solution which is the aqueous solution containing the salts of strong acids and weak bases, i.e., the salts of at least one type of ions selected from $Cl^-$, $SO_4^{2-}$, $HSO_4^-$, and $NO_3^-$ and at least one type of ions selected from Al ions, Mg ions, Fe ions, and ammonium ions can further improve the discharge characteristics of the sheet-type cell.

The salt of $Cl^-$ ions and $Fe^{3+}$ ions (i.e., iron (III) chloride) has a strong corrosive action on the metal material that can be a negative electrode active material, as compared to salts of other combinations of ions. Therefore, salts other than iron (III) chloride are preferably used. Moreover, ammonium salts are more preferred because they have a lower corrosive action on the metal material.

Among the above salts of strong acids and weak bases, perchlorate may create a risk of combustion or explosion when it is heated or subjected to shock. Therefore, from the viewpoint of environmental impact and safety of disposal, perchlorate should not be contained in the aqueous solution. Even if it is contained, the amount of perchloric acid ions is preferably as small as possible (i.e., preferably less than 100 ppm, and more preferably less than 10 ppm).

Among the above salts of strong acids and weak bases, heavy metal salts (other than iron salts) typified by, e.g., zinc chloride and copper sulfate are often harmful. Therefore, from the viewpoint of environmental impact and safety of disposal, heavy metal salts should not be contained in the aqueous solution. Even if they are contained, the amount of heavy metal ions other than iron ions is preferably as small as possible (i.e., preferably less than 100 ppm, and more preferably less than 10 ppm).

When the sheet-type cell is an air cell, the aqueous solution that can be used as the electrolyte solution preferably contains a water-soluble high-boiling solvent with a boiling point of 150° C. or more along with water. As the air cell is discharged, the voltage decreases with a decrease in the capacity. In the late stage of discharge, since the capacity of the air cell becomes smaller, the voltage not only decreases but also tends to vary greatly. However, the presence of the water-soluble high-boiling solvent in the aqueous solution can suppress such a voltage variation in the late stage of discharge. Thus, the air cell can have better discharge characteristics. The upper limit of the boiling point of the water-soluble high-boiling solvent is usually 320° C.

It is desirable that the water-soluble high-boiling solvent has a high surface tension and a high relative dielectric constant. Specific examples of the water-soluble high-boiling solvent include the following: polyhydric alcohols such as ethylene glycol (boiling point: 197° C., surface tension: 48 mN/m, relative dielectric constant: 39), propylene glycol (boiling point: 188° C., surface tension: 36 mN/m, relative dielectric constant: 32), and glycerol (boiling point: 290° C., surface tension: 63 mN/m, relative dielectric constant: 43); and polyalkylene glycol (having a molecular weight of preferably 600 or less) such as PEG (e.g., boiling point: 230° C., surface tension: 43 mN/m, relative dielectric constant: 35). The electrolyte solution may contain either only one or two or more of these water-soluble high-boiling solvents, and more preferably may contain glycerol.

To ensure a good effect of the water-soluble high-boiling solvent when it is used, the content of the water-soluble high-boiling solvent in the aqueous solution is preferably 1% by mass or more, and more preferably 3% by mass or more of the total solvent. However, if the amount of the water-soluble high-boiling solvent in the aqueous solution is too large, the ionic conduction of the aqueous solution becomes too small, so that the cell characteristics may be reduced. Thus, the content of the water-soluble high-boiling solvent in the aqueous solution is preferably 30% by mass or less, and more preferably 20% by mass or less of the total solvent.

The concentration of the electrolyte salt in the aqueous solution may be set so that the conductivity of the aqueous solution can be adjusted, e.g., to about 80 to 700 mS/cm. The concentration of the electrolyte salt is usually 5 to 50% by mass.

It is preferable that an indium compound is dissolved in the solvent (water or a mixed solvent of water and the water-soluble high-boiling solvent) of the aqueous solution used as the electrolyte solution. When the indium compound is dissolved in the aqueous solution, the generation of hydrogen gas inside the cell can be adequately suppressed.

Examples of the indium compound dissolved in the aqueous solution include indium hydroxide, indium oxide, indium sulfate, indium sulfide, indium nitrate, indium bromide, and indium chloride.

The concentration of the indium compound in the aqueous solution is preferably 0.005% by mass or more, more preferably 0.01% by mass or more, and particularly preferably 0.05% by mass or more. The concentration of the indium compound in the aqueous solution is also preferably 1% by mass or less, more preferably 0.5% by mass or less, and particularly preferably 0.1% by mass or less.

In addition to the above described components, the aqueous solution may optionally contain various known additives so as not to impair the effects of the present invention. For example, zinc oxide may be added to the aqueous solution to prevent corrosion (oxidation) of the metal material used for the negative electrode.

The aqueous solution used as the electrolyte solution may be gelled, and a gel electrolyte solution (gel electrolyte) is also preferably used as the electrolyte solution of the sheet-type cell. The gel electrolyte solution may be prepared by mixing a thickening agent (such as sodium polyacrylate or carboxymethyl cellulose) and the aqueous solution that contains the electrolyte salt and has a pH of 3 or more and less than 12. The use of the gel electrolyte solution can also suppress the voltage variation in the late stage of discharge and can further improve the discharge characteristics of the sheet-type cell. Moreover, since the vaporization of water from the gel electrolyte solution is reduced, it is possible, particularly for the air cell having air holes in the sheet-type outer case, to suppress a reduction in the discharge characteristics due to the composition change of the electrolyte solution, and also to further improve the storage characteristics of the cell.

The thickening agent that can be contained in the electrolyte solution may be any of various synthetic polymers or natural polymers. Specific examples of the thickening agent include the following: cellulose derivatives such as carboxymethyl cellulose (CMC) and carboxyethyl cellulose (CEC); polyalkylene oxide (having a molecular weight of preferably 1000 or more, more preferably 10000 or more, and particularly preferably 100000 or more) such as polyethylene oxide (PEO); polyvinylpyrrolidone; polyvinyl acetate; starch; guar gum; xanthan gum; sodium alginate; hyaluronic acid; gelatin; and polyacrylic acid and its salts (such as sodium polyacrylate).

In order to enhance the effects of suppressing a reduction in the discharge characteristics due to the composition change of the electrolyte solution and improving the storage characteristics of the cell, the content of the thickening agent in the electrolyte solution is preferably 0.1% by mass or more, more preferably 1% by mass or more, and most preferably 3% by mass or more. On the other hand, in order to prevent a reduction in the discharge characteristics, the content of the thickening agent in the electrolyte solution is preferably 20% by mass or less, more preferably 15% by mass or less, and most preferably 10% by mass or less.

The sheet-type cell of the present disclosure may be a primary cell that has the above sheet-type outer case and the above aqueous solution as an electrolyte solution. The sheet-type cell may be in any form, including an alkaline cell, a manganese cell (manganese dry cell), and an air cell.

When the sheet-type cell is an alkaline cell or a manganese cell, the positive electrode may have a structure in which a positive electrode mixture layer containing, e.g., a positive electrode active material, a conductive assistant, and a binder is formed on one side or both sides of a current collector.

When the sheet-type cell is an alkaline cell, examples of the positive electrode active material include silver oxides (such as silver (I) oxide and silver (II) oxide), manganese oxides such as manganese dioxide, nickel oxyhydroxide, and composite oxides of silver and cobalt, nickel, or bismuth. When the sheet-type cell is a manganese cell, examples of the positive electrode active material include manganese oxides such as manganese dioxide.

Examples of the conductive assistant of the positive electrode mixture layer include the following: carbon blacks such as acetylene black, Ketjenblack, channel black, furnace black, lamp black, and thermal black; carbon materials such as carbon fibers; conductive fibers such as metallic fibers; carbon fluoride; metal powders of copper, nickel, etc.; and organic conductive materials such as polyphenylene derivatives.

Examples of the binder of the positive electrode mixture layer include the following: polyvinylidene fluoride (PVDF), polytetrafluoroethylene (PTFE), styrene-butadiene rubber (SBR), carboxymethyl cellulose (CMC), and polyvinyl pyrrolidone (PVP).

In the composition of the positive electrode mixture layer, the amount of the positive electrode active material is preferably 80 to 98% by mass, the content of the conductive assistant is preferably 1.5 to 10% by mass, and the content of the binder is preferably 0.5 to 10% by mass. The thickness of the positive electrode mixture layer is preferably 30 to 300 μm (per one side of the current collector).

The positive electrode having the positive electrode mixture layer can be produced in the following manner. For example, the positive electrode active material, the conductive assistant, and the binder are dispersed in water or an organic solvent such as N-methyl-2-pyrrolidone (NMP) to prepare a positive electrode mixture containing composition, e.g., in the form of slurry or paste (in this case, the binder may be dissolved in the solvent). This composition is applied to the current collector, dried, and optionally subjected to pressing such as calendering.

When the sheet-type cell is an air cell, the positive electrode has a catalyst layer. For example, the positive electrode with a laminated structure of the catalyst layer and the current collector may be used.

The catalyst layer may contain, e.g., a catalyst and a binder.

Examples of the catalyst of the catalyst layer include the following: silver; platinum metals or alloys thereof transition metals; platinum/metal oxides such as $Pt/IrO_2$; perovskite oxides such as $La_{1-x}Ca_xCoO_3$; carbides such as WC; nitrides such as $Mn_4N$; manganese oxides such as manganese dioxide; and carbon (inducing, e.g., graphite, carbon black (acetylene black, Ketjenblack, channel black, furnace black, lamp black, thermal black, etc.), charcoal, and activated carbon). These catalysts may be used alone or in combinations of two or more.

The heavy metal content in the catalyst layer, except for the components of the electrolyte solution, is preferably 1% by mass or less. When the positive electrode has the catalyst layer with a low heavy metal content, the environmental impact can be reduced even if the cell is disposed of without any special treatment.

In the present specification, the heavy metal content in the catalyst layer can be measured by X-ray fluorescence analysis. For example, the measurement can be performed using "ZSX100e" (trade name) manufactured by Rigaku Corporation under the following conditions: excitation source, Rh 50 kV and analysis area, φ 10 mm.

Thus, catalysts containing no heavy metal are recommended as the catalyst of the catalyst layer, and the above carbon is more preferred.

In terms of further improving the reactivity of the positive electrode, the specific surface area of the carbon that is used as the catalyst is preferably 200 $m^2/g$ or more, more preferably 300 $m^2/g$ or more, and further preferably 500 $m^2/g$ or more. The specific surface area of the carbon is determined by a BET method in accordance with JIS K 6217. For example, the specific surface area of the carbon can be measured with a specific surface area measuring device ("Macsorb HM model-1201" (trade name) manufactured by Mountech Co., Ltd.) based on a nitrogen adsorption method. The upper limit of the specific surface area of the carbon is usually about 2000 $m^2/g$.

The content of the catalyst in the catalyst layer is preferably 20 to 70% by mass.

Examples of the binder of the catalyst layer include fluorocarbon resin binders such as PVDF, PTFE, copolymers of vinylidene fluoride, and copolymers of tetrafluoroethylene (including, e.g., a vinylidene fluoride-hexafluoropropylene copolymer (PVDF-HFP), a vinylidene fluoride-chlorotrifluoroethylene copolymer (PVDF-CTFE), a vinylidene fluoride-tetrafluoroethylene copolymer (PVDF-TFE), and a vinylidene fluoride-hexafluoropropylene-tetrafluoroethylene copolymer (PVDF-HFP-TFE)). Among them, polymers of tetrafluoroethylene (PTFE) or copolymers of tetrafluoroethylene are preferred, and PTFE is more preferred. The content of the binder in the catalyst layer is preferably 3 to 50% by mass.

The positive electrode having the catalyst layer can be produced by, e.g., mixing the above catalyst, binder, or the like with water, rolling the mixture between rotating rolls, and bringing the rolled material into close contact with the current collector. There may be another way of producing the positive electrode. First, a composition (slurry, paste, etc.) for forming a catalyst layer is prepared by dispersing the above catalyst and optionally the binder or the like in water or an organic solvent. Then, the composition is applied to the surface of the current collector and dried, which is further subjected to pressing (e.g., calendering) as needed.

The current collector of the positive electrode having the catalyst layer or the positive electrode mixture layer may be, e.g., a mesh, foil, expanded metal, or punched metal made of metals such as titanium, nickel, stainless steel, and copper or may be, e.g., a porous carbon base material such as a mesh, sheet, nonwoven fabric, or carbon paper made of carbon. The thickness of the current collector of the positive electrode is preferably 10 to 300 μm.

Moreover, the resin film constituting the sheet-type outer case may also be used as the current collector of the positive electrode. In such a case, e.g., the current collector can be provided by applying a carbon paste to the surface of the resin film that is to be the inner surface of the sheet-type outer case. Then, the positive electrode mixture layer or the catalyst layer can be formed on the surface of the current collector in the same manner as described above, thus producing the positive electrode. The thickness of the carbon paste layer is preferably 30 to 300 μm.

The negative electrode of the sheet-type cell may contain a metal material. Examples of the metal material include the following: a zinc-based material; a magnesium-based material (which collectively refers to both a magnesium material and a magnesium alloy material); and an aluminum-based material (which collectively refers to both an aluminum material and an aluminum alloy material). In this negative electrode, metals such as zinc, magnesium, and aluminum act as an active material.

Specifically, the negative electrode containing the metal material may be a negative electrode that contains metal particles such as zinc-based particles (which collectively refer to both zinc particles and zinc alloy particles), magnesium-based particles (which collectively refer to both magnesium particles and magnesium alloy particles), and aluminum-based particles (which collectively refer to both aluminum particles and aluminum alloy particles).

The alloy constituents of the zinc alloy particles may be, e.g., indium (the content is, e.g., 0.001 to 0.1% by mass and preferably 0.005 to 0.05% by mass), bismuth (the content is, e.g., 0.001 to 0.1% by mass and preferably 0.005 to 0.05% by mass), and aluminum (the content is, e.g., 0.001 to 0.15% by mass and preferably 0.002 to 0.02% by mass).

The alloy constituents of the magnesium alloy particles may be, e.g., calcium (the content is, e.g., 1 to 3% by mass), manganese (the content is, e.g., 0.1 to 0.5% by mass), zinc (the content is, e.g., 0.4 to 1% by mass), and aluminum (the content is, e.g., 8 to 10% by mass).

The alloy constituents of the aluminum alloy particles may be, e.g., zinc (the content is, e.g., 0.5 to 10% by mass), tin (the content is, e.g., 0.04 to 1.0% by mass), gallium (the content is, e.g., 0.003 to 1.0% by mass), silicon (the content is, e.g., 0.05% by mass or less), iron (the content is, e.g., 0.1% by mass or less), magnesium (the content is, e.g., 0.1 to 2.0% by mass), and manganese (the content is, e.g., 0.01 to 0.5% by mass).

The negative electrode may contain only one type of metal particles or two or more types of metal particles.

In view of a reduction in the environmental impact of the cell for disposal, it is preferable that the metal material used for the negative electrode contains the smallest possible amount of mercury cadmium, lead, and chromium. Specifically, it is more preferable that the mercury content is 0.1% by mass or less, the cadmium content is 0.01% by mass or less, the lead content is 0.1% by mass or less, and the chromium content is 0.1% by mass or less.

The particle size of the zinc-based particles may be defined as follows. For example, the proportion of the particles with a particle diameter of 75 μm or less is preferably 50% by mass or less, and more preferably 30% by mass or less of all particles. Moreover, the proportion of the particles with a particle diameter of 100 to 200 μm may be 50% by mass or more, and more preferably 90% by mass or more of all particles.

The particle size of the magnesium-based particles and the aluminum-based particles may be defined as follows. For example, the proportion of the particles with a particle diameter of 30 μm or less is preferably 50% by mass or less, and more preferably 30% by mass or less of all particles. Moreover, the proportion of the particles with a particle diameter of 50 to 200 μm may be 50% by mass or more, and more preferably 90% by mass or more of all particles.

In the present specification, the particle size of the metal particles means a particle diameter (D50) at a cumulative frequency of 50% in the volume-based distribution, which is measured with a laser scattering particle size distribution analyzer (e.g., "LA-920" (trade name) manufactured by HORIBA, Ltd.) by dispersing the particles in a medium that does not dissolve those particles.

When the negative electrode contains the metal particles, e.g., a gelling agent (a compound such as sodium polyacrylate or carboxymethyl cellulose used as the thickening agent to gel the electrolyte solution) and a binder may be added as needed. This may be mixed with an electrolyte solution to form a negative electrode agent (such as a gel-like negative electrode). The amount of the gelling agent in the negative electrode is preferably, e.g., 0.5 to 1.5% by mass. The amount of the binder in the negative electrode is preferably 0.5 to 3% by mass.

The electrolyte solution used for the negative electrode containing the metal particles may be the same as that injected into the cell.

The content of the metal particles in the negative electrode is preferably, e.g., 60% by mass or more, and more preferably 65% by mass or more. The content of the metal particles in the negative electrode is also preferably 95% by mass or less, and more preferably 90% by mass or less.

The negative electrode containing the metal particles preferably contains an indium compound. The presence of the indium compound in the negative electrode can more effectively prevent the generation of hydrogen gas due to a corrosion reaction between the metal particles and the electrolyte solution.

Examples of the indium compound include indium oxide and indium hydroxide.

The amount of the indium compound in the negative electrode is preferably 0.003 to 1 with respect to 100 of the metal particles at a mass ratio.

The negative electrode may also be a metal sheet such as a zinc-based sheet (e.g., zinc foil or zinc alloy foil) having the same composition as the zinc-based particles or a magnesium-based sheet (e.g., magnesium foil or magnesium alloy foil) having the same composition as the magnesium-based particles. When the negative electrode is made of zinc foil or zinc alloy foil, the use of electrolytic foil is preferred to suppress the corrosion by the electrolyte solution and to prevent the generation of hydrogen. In this case, the use of electrolytic zinc alloy foil is more preferred. It is preferable that the electrolytic zinc alloy foil contains at least bismuth in terms of the effect of suppressing the generation of hydrogen. The content of bismuth in the zinc alloy is preferably 0.001% by mass or more, more preferably 0.01% by mass or more, and particularly preferably 0.02% by mass or more. On the other hand, to prevent a reduction in the discharge characteristics, the content of bismuth in the zinc alloy is preferably 0.2% by mass or less, more preferably 0.1% by mass or less, and particularly preferably 0.07% by mass or less.

When the negative electrode is a metal sheet, the thickness is preferably 10 to 500 µm.

The negative electrode containing the metal material may include a current collector as needed. The current collector of the negative electrode may be, e.g., a mesh, foil, expanded metal, or punched metal made of metals such as nickel, copper, and stainless steel or may be, e.g., a sheet or mesh made of carbon. The thickness of the current collector of the negative electrode is preferably 10 to 300 µm.

Like the positive electrode, the current collector of the negative electrode can be provided by applying a carbon paste to the surface that is to be the inner surface of the sheet-type outer case. The thickness of the carbon paste layer is preferably 50 to 200 µm.

The separator of the sheet-type cell may be any separator that is generally used in various cells. Examples of the separator include a porous resin film (such as a microporous film or nonwoven fabric) and a semipermeable membrane typified by a cellophane film. In terms of preventing a short circuit of the sheet-type cell and improving the load characteristics, the separator is preferably made of a semipermeable membrane.

When the separator is made of a resin porous film, polyolefins such as polyethylene (PE), polypropylene (PP), and an ethylene-propylene copolymer may be used.

The resin separator preferably has a porosity of 30 to 80% and a thickness of 10 to 100 µm.

When the separator is made of a semipermeable membrane such as a cellophane film, it may consist only of the semipermeable membrane. However, the semipermeable membrane can easily be damaged during cell assembly because of its low strength. Therefore, it is also recommended that the separator should be made of a laminated material of the semipermeable membrane and a grafted film of a particular polymer.

The graft polymer of the grafted film is composed of, e.g., (meth)acrylic acid or its derivative that is graft-polymerized onto polyolefin (polyethylene, polypropylene, etc.), which is a backbone polymer. However, any graft polymer in this form may be used and is not limited to the method of graft polymerization of (meth)acrylic acid or its derivative onto polyolefin.

In the grafted film and the cellophane film, their polymers have the ability to absorb the electrolyte solution and allow ions to pass through them.

When the separator is made of a laminated material of a grafted film and a cellophane film, the thickness of the separator, i.e., the total thickness of the grafted film and the cellophane film is preferably, e.g., 30 µm or more, and more preferably 40 µm or more. The thickness of the separator is also preferably 70 µm or less, and more preferably 60 µm or less.

The separator may be formed by combining, e.g., the cellophane film or both the cellophane film and the grafted film with a liquid-absorbing layer (i.e., an electrolyte solution holding layer) such as vinylon-rayon mixed paper. In this case, the thickness of the liquid-absorbing layer is preferably 20 to 500 µm.

Hereinafter, a specific configuration of a sheet-type cell of the present disclosure will be described with reference to the drawings.

FIG. 1 is a plan view schematically illustrating an example of a sheet-type cell of the present disclosure.

Figure 2:
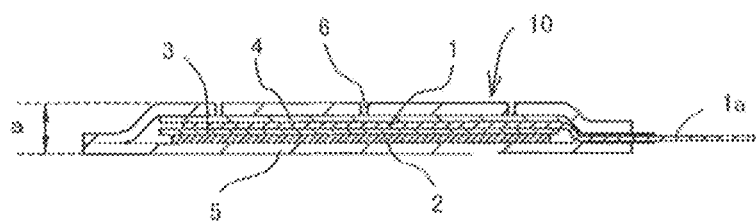
FIG. 2 is a cross-sectional view schematically illustrating an example of a sheet-type cell of the present disclosure.

FIG. 2 is a cross-sectional view schematically illustrating an example of a sheet-type cell of the present disclosure.

In the example of FIGS. 1 and 2, the sheet-type cell is an air cell. FIG. 2 illustrates the cross-sectional configuration taken along the line I-I in FIG. 1.

As shown in FIG. 2, a sheet-type cell 10 includes a positive electrode 1, a separator 3, a negative electrode 2, and an electrolyte solution (not shown) that are contained in a sheet-type outer case 5. In FIG. 1, the dotted line represents the size of the positive electrode 2 (corresponding to the size of a wide main body portion other than a terminal portion, i.e., the size of a catalyst layer of the positive electrode) contained in the sheet-type outer case 5.

A terminal 1a of the positive electrode 1 and a terminal 2a of the negative electrode 2 protrude from the upper side of the sheet-type outer case 5 in FIG. 1. The terminals 1a, 2a are used as external terminals for electrically connecting the sheet-type cell 10 to the applicable equipment.

The sheet-type outer case 5 has a plurality of air holes 6 in the side where the positive electrode 1 is provided so as to take air into the positive electrode. Moreover, a water repellent membrane 4 is provided on the surface of the positive electrode 1 that faces the sheet-type outer case 5 to prevent leakage of the electrolyte solution through the air holes 6.

When the air holes are formed in the sheet-type outer case made of a resin film, the amounts of air (oxygen) and carbon dioxide that enter the cell and the amount of water that evaporates from the electrolyte solution and dissipates to the outside of the system may vary depending on the size and number of the air holes. Thus, it is desirable that the air holes are formed so that the cell can achieve both the discharge characteristics and the storage characteristics.

For example, the ratio (s/t) of the total area of all air holes (represented by s ($mm^2$) in the following) to the area of the catalyst layer (represented by t ($mm^2$) in the following) is set to a predetermined value or more. This configuration can introduce air (oxygen) required for the reaction in the sheet-type cell. Thus, the catalyst layer can function efficiently, and the discharge characteristics of the cell can be improved.

On the other hand, when the ratio s/t is limited to a predetermined value or less, it is possible to prevent carbon dioxide from entering the cell through the air holes and to reduce the dissipation of water contained in the electrolyte solution. Thus, the storage characteristics of the cell can be improved.

In view of the above, it is desirable that one or more air holes are formed to satisfy $0.0002 \leq s/t \leq 0.03$. The value s/t is preferably 0.0003 or more, more preferably 0.003 or less, and particularly preferably $0.0004 \leq s/t \leq 0.002$.

If the area of each air hole is too small, it becomes difficult to form the air holes as designed in the outer case. Consequently, it is likely that the cell has a problem of, e.g., being unable to achieve expected cell characteristics. Thus, the area of each air hole is preferably 0.002 mm$^2$ or more, more preferably 0.008 mm$^2$ or more, particularly preferably 0.02 mm$^2$ or more, and most preferably 0.03 mm$^2$ or more. For example, when the air holes are circular in shape, each air hole may have a diameter of 0.05 mm or more so that the area is 0.002 mm$^2$ or more. Moreover, each air hole may have a diameter of 0.16 mm or more so that the area is 0.02 mm$^2$ or more.

If the area of each air hole is too large, it becomes difficult to adjust the ratio s/t in the above range. In addition, carbon dioxide can easily enter the cell, and the dissipation of water contained in the electrolyte solution can also occur easily. Thus, the area of each air hole is preferably 0.8 mm$^2$ or less, more preferably 0.5 mm$^2$ or less, particularly preferably 0.4 mm$^2$ or less, and most preferably 0.3 mm$^2$ or less. For example, when the air holes are circular in shape, each air hole may have a diameter of 1 mm or less so that the area is 0.8 mm$^2$ or less. Moreover, each air hole may have a diameter of 0.8 mm or less so that the area is 0.5 mm$^2$ or less.

In the present specification, the area of each air hole means the actual area of an opening in the outer surface of the sheet-type outer case, and can be measured by, e.g., electron micrographs.

The air holes should be arranged so that air can be supplied more uniformly over the entire catalyst layer to allow the catalyst layer to function efficiently. Thus, the number of the air holes is preferably three or more, and more preferably four or more. The upper limit of the number of the air holes is not limited as long as the area of each air hole and the ratio sit meet the above conditions, respectively.

When a plurality of air holes are formed, it is desirable that the air holes are regularly arranged based on the repetition of a particular pattern. The arrangement of the air holes may include one type of repeated pattern or two or more types of repeated patterns.

Figure 3:
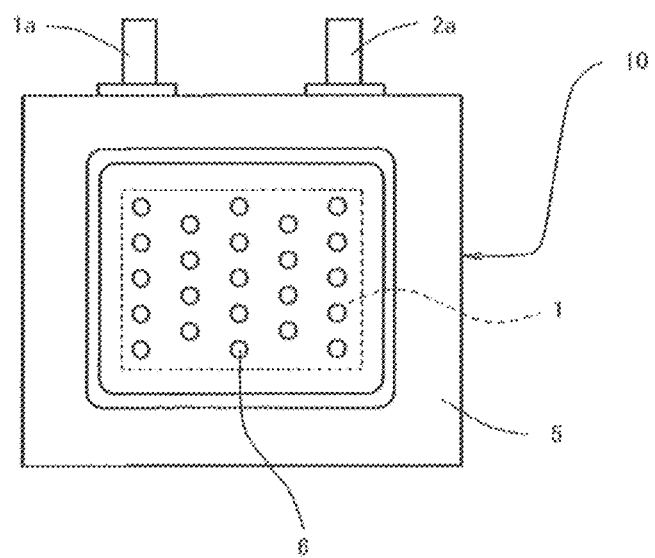
FIG. 3 is a plan view schematically illustrating another example of a sheet-type cell of the present disclosure.

FIG. 3 is a plan view schematically illustrating another example of a sheet-type cell of the present disclosure.

In the example of FIG. 3, the sheet-type outer case made of a resin film has a plurality of air holes 6 in the portion that overlaps the positive electrode 1. The number of the air holes 6 is larger in the sheet-type cell in FIG. 3, having 23 air holes, than in the sheet-type air cell in FIG. 1, having 9 air holes. As shown in FIG. 1, a total of nine air holes 6 are arranged in 3 straight rows and 3 straight columns. On the other hand, as shown in FIG. 3, the air holes 6 are arranged in 3 columns of 5 air holes each and 2 columns of 4 air holes each. These columns are staggered with respect to each other such that each air hole in the column consisting of 4 air holes 7 is in the intermediate position between two air holes of the adjacent column consisting of 5 air holes 7.

As described above, the air holes 7 are regularly arranged in both the vertical and horizontal directions. Thus, the space between the air holes 7 can be substantially uniform, and air can be supplied evenly over the entire positive electrode 1. The patterns for regularly arranging the air holes 6 may preferably include the following: a so-called parallel arrangement in which the air holes are located at grid points where equally-spaced parallel lines intersect with each other (see FIG. 1); a staggered arrangement (see FIG. 3); and well-known various geometric pattern arrangements or the combination thereof.

Figure 4:
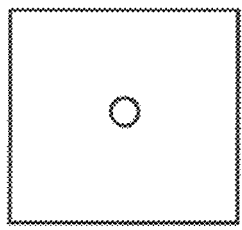
FIG. 4 is a diagram illustrating examples of the arrangement of air holes when they are formed in a sheet-type outer case.
Figure 4:
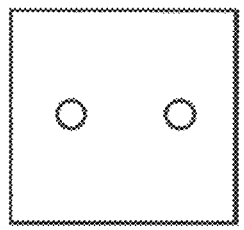
Figure 4:
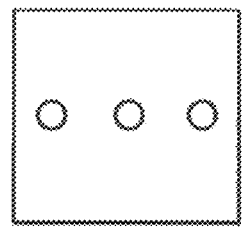
Figure 4:
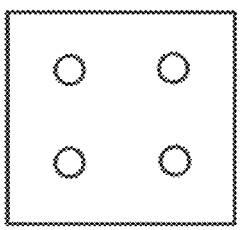
Figure 4:
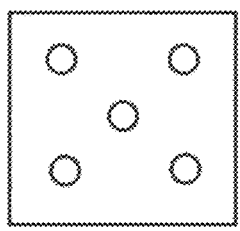
Figure 4:
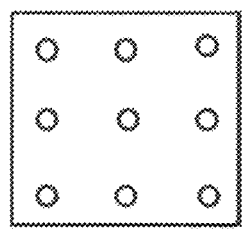
Figure 4:
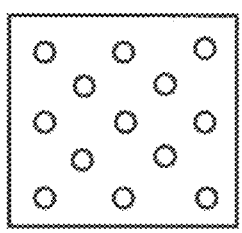
Figure 4:
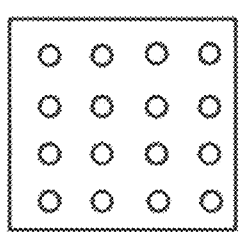

FIG. 4 is a diagram illustrating examples of the arrangement pattern of air holes when they are formed in a sheet-type outer case.

FIG. 4 shows the positions of one or more air holes relative to a rectangular region in which the catalyst layer (as will be described in detail later) of the positive electrode is to be provided, with the number of the air holes being one (FIG. 4(a)), two (FIG. 4(b)), three (FIG. 4(c)), four (FIG. 4(d)), five (FIG. 4(e)), nine (FIG. 4(f)), thirteen (FIG. 4(g)), and sixteen (FIG. 4(h)).

When a plurality of air holes are formed, the air holes may be arranged in horizontal rows and vertical columns, as shown in FIGS. 4(a) to 4(h). Thus, the air holes can be arranged substantially uniformly in the region corresponding to the entire catalyst layer of the positive electrode. Moreover, it is preferable that the center of the arrangement pattern of the air holes coincides with the center of the catalyst layer to prevent the region in which the air holes are arranged from constituting only a part of the catalyst layer. As a result, when the number of the air holes formed is an odd number, an air hole is arranged in the center of the catalyst layer. When the number of the air holes formed is an even number, no air hole is arranged in the center of the catalyst layer.

The arrangement patterns of the air holes in FIGS. 4(a) to 4(h) are merely examples, and any arrangement pattern may be used that enables the air holes to be arranged uniformly as much as possible, i.e., the space between the adjacent air holes to be constant as much as possible over the entire catalyst layer. When the catalyst layer is not rectangular, but polygonal other than quadrangular (e.g., triangular or hexagonal), substantially circular, or elliptical in shape, the air holes will be arranged in accordance with the shape of the catalyst layer. For example, the shape of the arrangement region of the air holes is obtained by connecting the centers of the individual air holes, and the obtained shape can be made substantially the same as the shape of the catalyst layer. Then, the center of the arrangement region of the air holes is allowed to substantially coincide with the center of the catalyst layer. Thus, the resulting arrangement pattern of the air holes can supply air evenly over the entire catalyst layer.

When a plurality of air holes are arranged, air cannot be supplied uniformly over the entire surface of the catalyst layer if the distance between the adjacent air holes is too small or too large. Thus, the distance between the adjacent air holes is preferably 2 mm or more and 10 mm or less, more preferably 3 mm or more, and even more preferably 8 mm or less. The method for forming the air holes in the sheet-type outer case is preferably, e.g., a method using hot needles or a laser irradiation method because very small air holes can be accurately formed in predetermined positions.

a. Formation of Air Hole with Hot Needle

Hereinafter, a method for forming air holes in a sheet-type outer case member using hot needles will be described.

For example, when a hot needle heated to 100° C. to 300° C. is pressed against a sheet-type outer case member made of a resin film, a mechanical pressure can be applied to the sheet-type outer case member at the same time as it is being melted by heat. Thus, a residue is not likely to be left on the opening, and a hole with a small opening diameter can easily be formed.

Figure 5:
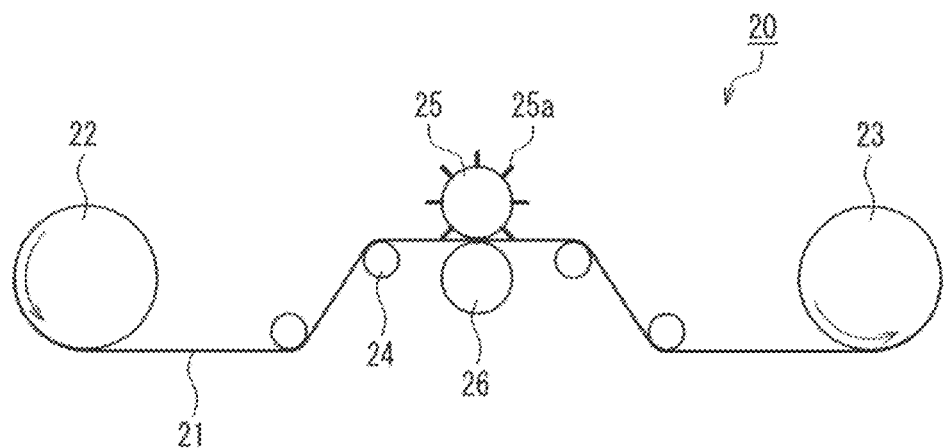
FIG. 5 is a conceptual diagram illustrating a process of forming air holes in a sheet-type outer case member made of a resin film by using hot needles.

FIG. 5 is a cross-sectional view illustrating the main portion of a schematic configuration of a punching device that forms air holes in a sheet-type outer case member by using hot needles.

As shown in FIG. 5, in a punching device 20 with hot needles, a ribbon-like resin sheet 21, which is a material before being cut into individual sheet-type outer case members, travels from a delivery roll 22 to a take-up roll 23. The ribbon-like resin sheet 21 passes between a hot needle roll 25 and a support roll 26 that are located opposite each other, while the position and the tension to be applied during punching are adjusted by a plurality of guide rolls 24.

The hot needle roll 25 has hot needles 25a. Each of the hot needles 25a protrudes from the surface of the hot needle roll 25 so that air holes with a predetermined size can be formed in a predetermined pattern in a predetermined region of the resin sheet 21 that will face the positive electrode when the resin sheet 21 is cut and used as a sheet-type outer case. Although not shown in FIG. 5, a heater is placed in the hot needle roll 25 to keep the hot needles 25a at a predetermined temperature.

The support roll 26 supports the resin sheet 21 to prevent the resin sheet 21 from being bent downward so that the punch position will not be shifted when the hot needles 25a of the hot needle roll 25 are pressed to form openings (air holes) in the resin sheet 21. The support roll 26 is provided with a silicon sponge layer (not shown) that receives the hot needles 25a penetrating the resin sheet 21.

Since the punching device shown in FIG. 5 uses the hot needles to form predetermined openings in the resin sheet, a sheet-type outer case with desired openings can be obtained at a low cost.

The punching device used in the method for producing a sheet-type air cell of this embodiment is not limited to the configuration in which the hot needles formed on the surface of the roll are pressed against the ribbon-like resin sheet travelling between two rolls, as shown in FIG. 5. Various types of punching devices can be used that have hot needles and are able to form air holes of a predetermined shape in predetermined positions of a sheet-type outer case member. For example, a punching device may include a planar heating substrate, a plurality of hot needles that are provided at predetermined positions of the substrate and arranged perpendicular to the surface of the substrate, and a support table on which a buffer member such as a silicon sponge is formed. In this punching device, pre-cut sheet-type outer case members are placed on the support table in sequence, and the substrate with the hot needles is pressed against each of the sheet-type outer case members to form air holes.

Figure 6:
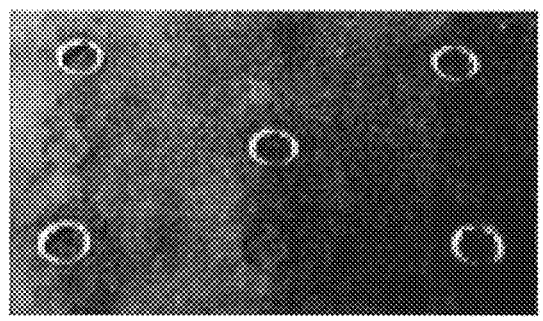
FIG. 6 is an enlarged view illustrating the shape of air holes formed in a resin film member by using hot needles.

FIG. 6 is an enlarged photograph showing the shape of openings formed in a resin sheet by a punching device using hot needles.

FIG. 6 confirms that the openings (air holes) formed in the resin sheet by using the hot needles have a clean shape without leaving a residue, as compared to the openings formed by a mechanical force of unheated needles.

b. Formation of Air Hole by Laser Irradiation

Figure 7:
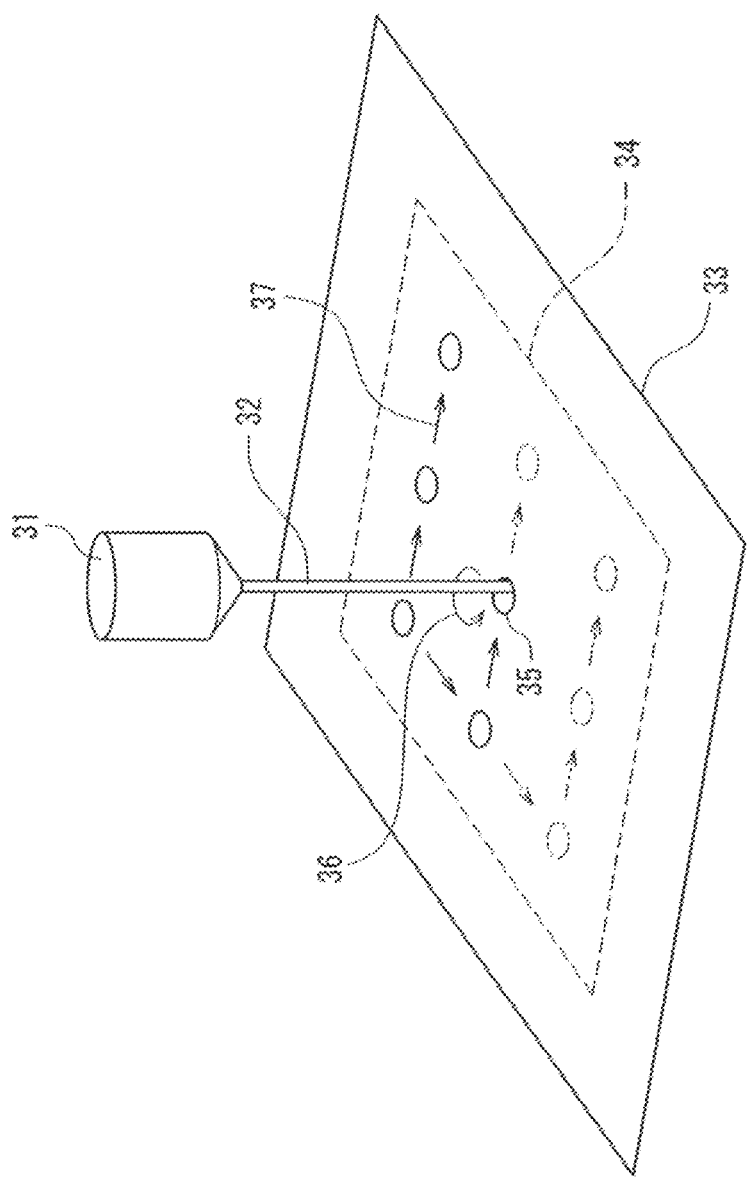
FIG. 7 is a conceptual diagram illustrating a process of forming air holes in a sheet-type outer case member made of a resin film by laser irradiation.

FIG. 7 is a conceptual diagram illustrating a process of forming air holes by laser irradiation.

As shown in FIG. 7, a laser beam 32 emitted from a laser irradiation source 31 forms an opening (air hole) 35 in an air hole formation region 34 of a sheet-type outer case member 33 made of resin. The air hole formation region 34 corresponds to the portion of a sheet-type outer case that will face the positive electrode. In this case, to form the opening 35 with a predetermined size, the beam diameter of the laser beam 32 is made smaller than the diameter of the opening 35, and the laser beam 32 is emitted while the irradiation position is rotated with respect to the center of the opening 45 to be formed, as indicated by the arrow 36 in FIG. 7. Moreover, to form the opening 35 in a predetermined position where an air hole is to be provided, a support table on which the sheet-type outer case member 33 is placed is appropriately moved in two orthogonal directions (x-axis direction and y-axis direction) so that the irradiation position of the laser beam 32 is moved relatively to the sheet-type outer case member 33, as indicated by the arrow 37 in FIG. 7.

In the conceptual diagram of FIG. 7, the single laser beam 32 is used to form nine openings. If it is possible to arrange a plurality of laser irradiation sources 41 according to the intervals at which openings are formed, e.g., three openings aligned in a row direction or a column direction can be formed simultaneously.

As described above, when a series of laser irradiation sources 31 can be arranged in a line to form openings aligned in the row direction or the column direction simultaneously in the sheet-type outer case member 33, a ribbon-like resin sheet may be used and the positions of the openings to be formed may be brought to the irradiation positions of the laser beams while the resin sheet is travelling between two rolls, similarly to the punching device 20 that forms openings with the hot needles, as shown in FIG. 5. This method can form the openings simultaneously in a plurality of sheet-type outer case members and then cut the sheet-type outer case members. Thus, the sheet-type outer case members having predetermined openings can be produced at a lower cost.

The type of the laser used is not particularly limited. For example, infrared lasers such as a CO2 laser, a YAG laser, and a semiconductor laser or ultraviolet lasers such as an excimer laser may be appropriately selected depending on the material.

As represented by the above specific methods for forming openings (air holes), when openings are formed in a resin member by hot needles or laser irradiation, air holes of a predetermined shape can be formed in predetermined positions of a sheet-type outer case with precision and low cost.

The positive electrode 1 has a catalyst layer and may have, e.g., a laminated structure of the catalyst layer and the current collector. For the purpose of brevity, the individual layers of the positive electrode 1 are not distinguished from each other in FIG. 2. As shown in FIG. 2, the sheet-type outer case 5 (i.e., the resin film constituting the sheet-type outer case) has a single layer structure. The resin film may also have a multilayer structure.

The positive electrode current collector may have a shape that includes a main body portion in which the positive electrode mixture layer or the catalyst layer is formed and an exposed portion in which the positive electrode mixture layer or the catalyst layer is not formed. The exposed portion can be used as the terminal 1a of the positive electrode 1. Moreover, a separate lead may be attached to the positive electrode current collector by, e.g., welding and used as the terminal 1a.

When the negative electrode 2 has a negative electrode current collector, the negative electrode current collector may have a shape that includes a main body portion in which the layer containing the negative electrode active material or the like is formed and an exposed portion in which the layer containing the negative electrode active material or the like is not formed. The exposed portion can be used as the terminal 2a of the negative electrode 2. Moreover, a separate lead may be attached to the negative electrode current collector by, e.g., welding and used as the terminal 2a. When the negative electrode 2 is formed of metal foil that is to be a negative electrode active material, the negative electrode 2 may have a shape that includes a main body portion that faces the positive electrode 1 and a portion that faces away from the positive electrode 1. The portion of the negative electrode 2 that faces away from the positive electrode 1 can be used as the terminal 2a.

The shape of the sheet-type outer case may be, e.g., a polygon (such as triangle, quadrangle, pentagon, hexagon, heptagon, or octagon), a circle, or an ellipse in a plan view. When the sheet-type outer case has a polygonal shape in a plan view, the terminal 1a of the positive electrode 1 and the terminal 2a of the negative electrode 2 may be drawn from the same side or different sides of the sheet-type outer case to the outside.

When the sheet-type cell is an air cell, the water repellent membrane 4 is usually placed between the positive electrode 1 and the sheet-type outer case 5, as shown in FIG. 2. The water repellent membrane 4 has not only water repellency, but also air permeability. Specific examples of the water repellent membrane 4 include a resin porous membrane composed of, e.g., fluororesin such as PTFE or polyolefins such as polypropylene and polyethylene. The thickness of the water repellent membrane is preferably 50 to 250 μm.

When the sheet-type cell is an air cell, an air diffusion membrane may be provided between the sheet-type outer case 5 and the water repellent membrane 4. The air diffusion membrane serves to supply the air that has been taken into the outer case to the positive electrode. The air diffusion membrane may be, e.g., a nonwoven fabric made of resin such as cellulose, polyvinyl alcohol, polypropylene, or nylon. The thickness of the air diffusion membrane is preferably 100 to 250 μm.

Figure 8:
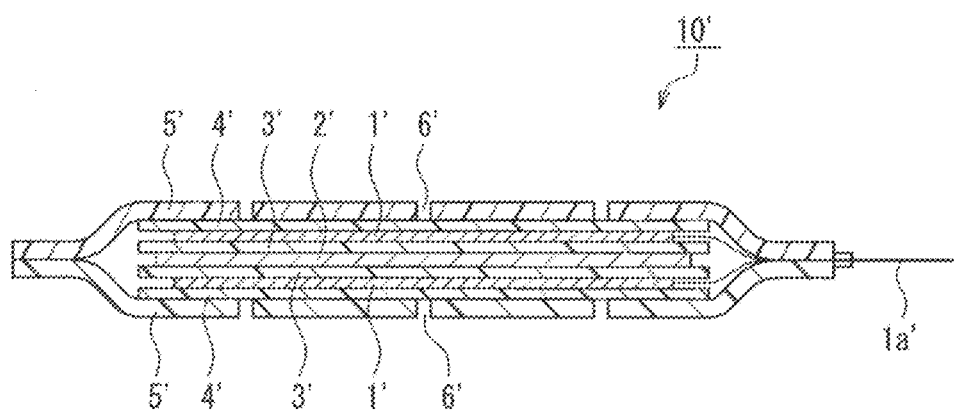
FIG. 8 is a cross-sectional view schematically illustrating an example of a sheet-type cell in which positive electrodes are provided on both sides of a negative electrode.

FIG. 8 is a cross-sectional view schematically illustrating an example of a sheet-type cell in which positive electrodes are provided on both sides of a negative electrode.

As shown in FIG. 8, a sheet-type cell 10' of the present disclosure is an air cell and includes a negative electrode 2' in the middle of a stack of power generation elements. Moreover, two positive electrodes 1' are provided on both sides of the negative electrode 2' via separators 3'. Water repellent membranes 4' are formed on the surfaces of catalyst layers (not shown) of the positive electrodes 1', respectively. Further, the water repellent membranes 4' are covered with a pair of sheet-type outer case members 5'. The sheet-type cell may be configured such that the positive electrodes are provided on both sides of the negative electrode, as shown in FIG. 8.

When the sheet-type cell 10' includes the positive electrodes 1' on both sides, as shown in FIG. 8, air holes 6' may be formed in the pair of sheet-type outer case members 5' to supply air to the respective positive electrodes 1'. Since the positive electrodes 1' are present on both sides in the sheet-type cell 10', the area of the positive electrode 1' can be approximately doubled, and the air cell having a large power generation capacity can easily be achieved. In FIG. 8, it is desirable that the air holes 6' are formed in the pair of sheet-type outer case members 5' so that the size and total area of the air holes in each of the sheet-type outer case members 5' are within the preferred ranges as described above.

The thickness of the sheet-type cell, represented by "a" in FIG. 2, is not particularly limited and may be appropriately changed depending on the use of the sheet-type cell. One of the advantages of the sheet-type cell is that the thickness can be reduced. In view of this, the thickness a of the sheet-type cell is preferably, e.g., 1.5 mm or less, and more preferably 1 mm or less. When the sheet-type cell is an air cell, it is particularly easy to provide such a thin cell.

The lower limit of the thickness a of the sheet-type cell is not particularly limited and may usually be 0.2 mm or more to maintain a predetermined amount of capacity.

The sheet-type cell of the present disclosure includes the electrolyte solution composed of an aqueous solution. In particular, when the aqueous solution has a preferred pH of 3 or more and less than 12, the environmental impact can be reduced. Moreover, even if the electrolyte solution leaks due to damage or the like and adheres to the body, it is less likely to cause trouble. Thus, the sheet-type cell of the present disclosure is suitable as a power source for medical and health equipment such as a patch that can be attached to the body, particularly a patch that is attached to the surface of the skin to measure information about body conditions, including body temperature, pulse, and perspiration. The sheet-type cell of the present disclosure is also suitable for the same applications as those of a sheet-type cell (primary cell) including an aqueous electrolyte solution such as a conventionally known air cell or an alkaline cell.

EXAMPLES

Hereinafter, the application of a sheet-type cell of the present disclosure to an air cell will be described in detail based on examples. However, the sheet-type cell of the present disclosure is not limited to the following examples.

(Consideration of Method for Forming Air Hole)

Example 1

<Production of Positive Electrode>

A composition for forming a catalyst layer was prepared by mixing 30 parts by mass of carbon (Ketjenblack EC600JD (trade name) manufactured by Lion Specialty Chemicals Co., Ltd.) with a DBP oil absorption of 495 $cm^3/100$ g and a specific surface area of 1270 $m^2/g$, 15 parts by mass of an acrylic dispersing agent, 60 parts by mass of SBR, and 500 parts by mass of water.

Using porous carbon paper (thickness: 0.25 mm, porosity: 75%, air permeability (Gurley): 70 sec/100 ml) as a current collector, the composition for forming a catalyst layer was applied to the surface of the current collector by stripe coating so that the coating amount after drying was 10 $mg/cm^2$. Then, the composition was dried, resulting in a base material for producing a positive electrode that had a portion in which the catalyst layer was formed and a portion in which no catalyst layer was formed.

This base material was punched into a shape including a 30 mm×30 mm main body portion with the catalyst layer (the area t of the catalyst layer: 900 $mm^2$) and a 5 mm×30 mm terminal portion without the catalyst layer. Thus, a positive electrode (air electrode) with a total thickness of 0.27 mm was produced.

<Production of Negative Electrode>

Zinc alloy foil (rolled foil) containing additional elements of In: 0.05% by mass, Bi: 0.04% by mass, and Al: 0.001% by mass was prepared. Then, the zinc alloy foil was punched into a shape including a 30 mm×30 mm main body portion and a 5 mm×30 mm terminal portion. Thus, a negative electrode was produced.

<Electrolyte Solution>

An ammonium sulfate aqueous solution of 20% by mass (having a pH of 5.3, which was measured in an environment of 25° C. with a "LAQUA twin compact pH meter" (trade name) manufactured by HORIBA, Ltd.) was prepared and used as an electrolyte solution.

<Separator>

A laminated film was produced by forming two graft films (each having a thickness of 15 μm) on both sides of a cellophane film (having a thickness of 20 μm). The graft films were composed of a graft copolymer obtained by graft copolymerization of acrylic acid with a polyethylene main chain. This laminated film (having a total thickness of 50 μm) was used as a separator.

<Water Repellent Membrane>

A water repellent membrane was a porous PTFE sheet with a thickness of 200 μm.

<Formation of Air Hole in Sheet-Type Outer Case Member>

Air holes were previously formed in a sheet-type outer case member that was to be located on the positive electrode side by using hot needles under the following conditions.

The sheet-type outer case member was made of an aluminum laminated film having a structure in which a PET film was provided on the outer surface of aluminum foil and a polypropylene film (heat-sealing resin layer) was provided on the inner surface of the aluminum foil. Circular air holes were formed in the outer case member of the aluminum laminated film by using hot needles heated to 200° C. under the conditions shown in Table 1.

|  | Properties of individual air holes | | Arrangement of air holes | Total area | |
| --- | --- | --- | --- | --- | --- |
|  | Diameter (mm) | Number of air holes | and center-to-center distance of adjacent air holes | of air holes s (mm²) | Area ratio (s/t) |
| Outer case member 1 | 0.2 | 9 | 3 (column) × 3 (row) 10 mm × 10 mm | 0.283 | 0.00031 |
| Outer case member 2 | 0.2 | 16 | 4 (column) × 4 (row) 7.5 mm × 7.5 mm | 0.503 | 0.00056 |
| Outer case member 3 | 0.2 | 36 | 6 (column) × 6 (row) 5 mm × 5 mm | 1.131 | 0.00126 |
| Outer case member 4 | 1 | 36 | 6 (column) × 6 (row) 5 mm × 5 mm | 28.274 | 0.03142 |
| Outer case member 5 | 0.2 | 4 | 2 (column) × 2 (row) 15 mm × 15 mm | 0.126 | 0.00014 |

An attempt had been made to form air holes with a diameter of 0.2 mm in the outer case member of the aluminum laminated film by a punching method using a die, but was not successful. When hot needles were used, air holes with a diameter of 0.2 mm were successfully formed. On the other hand, it was difficult to form circular air holes with a diameter smaller than 0.15 mm by the method using hot needles.

As described above, the diameter of the air holes formed in the sheet-type outer case of the sheet-type cell of the present disclosure is particularly preferably 0.16 mm or more. Thus, the method using hot needles is suitable for the formation of very small air holes in the sheet-type outer case member. In the above laser irradiation method, finer air holes with a diameter of about 0.02 mm can be successfully formed in addition to air holes with a diameter of about 0.16 mm, which can also be formed by the hot needles.

<Cell Assembly>

The opening conditions of the air holes in the outer case members 1 to 5 are shown in Table 1. Each of the outer case members 1 to 5 was cut to a size of 50 mm×50 mm. Then, the water repellent membrane was thermally fused to the inner surface of the region of the outer case member in which the air holes were formed by using a hot-melt adhesive, resulting in the outer case member that was to be located on the positive electrode side. Moreover, a similar outer case member of an aluminum laminated film having no air holes was prepared and cut to a size of 50 mm×50 mm. Then, a modified polyolefin ionomer film was attached in parallel with the side of the outer case member to a portion where the terminal portions of the positive electrode and the negative electrode were to be arranged, resulting in the outer case member that was to be located on the negative electrode side.

The positive electrode, the separator, and the negative electrode were disposed in this order on the water repellent membrane of the outer case member to be located on the positive electrode side. Subsequently, the outer case member to be located on the negative electrode side was placed on top of them so that the modified polyolefin ionomer film was positioned on the terminal portions of the positive electrode and the negative electrode.

Next, three sides of the two outer case members were thermally fused to each other, thus providing a bag-like outer case. After 0.1 ml of the electrolyte solution was injected through the opening of the bag-like outer case, the opening was sealed by thermal fusion. In this manner, a plurality of sheet-type air cells (for each of the cells 1 to 5) were obtained. Each of the sheet-type air cells had a total thickness of about 1.2 mm.

[Evaluation of Discharge Characteristic and Storage Characteristic]

Each of the cells 1 to 5 thus produced was allowed to stand at room temperature for 10 minutes, and then discharged to 0.8 V at a current corresponding to 10 hour rate (0.1 C) with respect to the design capacity of the cell, which was calculated from the amount of the active material in the main body portion of the negative electrode. Thus, the discharge capacity of the cell was obtained. The discharge characteristics of the cells 1 to 5 were evaluated based on their respective discharge capacities.

Using the cells 1 to 5 that were different from the cells for which the discharge characteristics had been evaluated, each of the cells 1 to 5 was allowed to stand with the air holes open in the environment of 60° C. and 90% RH for 24 hours, and then discharged under the same conditions as described above in the environment of 20° C. and 60% RH. Thus, the discharge capacity of the cell was obtained. The storage characteristics of the cells 1 to 5 were evaluated based on their respective discharge capacities.

Table 2 shows the results of the measurement of the discharge characteristics and the storage characteristics of these cells.

TABLE 2

|  | Outer case member to be located on positive electrode side | Discharge characteristics (mAh) | Storage characteristics (mAh) |
| --- | --- | --- | --- |
| Cell 1 | Outer case member 1 | 450 | 405 |
| Cell 2 | Outer case member 2 | 455 | 410 |
| Cell 3 | Outer case member 3 | 480 | 430 |
| Cell 4 | Outer case member 4 | 490 | 50 |
| Cell 5 | Outer case member 5 | 30 | 10 |

In the cells 1 to 3, very small air holes with a diameter of 0.2 mm were formed in the sheet-type outer case member to be located on the positive electrode side, and the total area of the air holes was 0.28 mm² or more. Therefore, as shown in Table 2, the cells 1 to 3 had the discharge characteristics indicated by 450 mAh and were able to maintain a sufficient discharge capacity even after they were left to stand for 24 hours.

On the other hand, like the conventional air cell, the cell 4 had air holes with a diameter of 1 mm. Consequently, the discharge characteristics were good, but the discharge capacity of the cell 4 was greatly reduced to 50 mAh after it was left to stand for 24 hours. This means that the evaporation of the electrolyte solution through the air holes was significant. The results confirm that the cells having very small air holes with a diameter as small as 0.2 mm can achieve excellent storage characteristics, as compared to the cell having air holes with the same diameter (about 1 mm) as that of air holes of the general air cell.

In the cell 5, although the diameter of the air holes was 0.2 mm, which was the same as that of the air holes of the cells 1 to 3, the number of the air holes was 4 and the total area of the air holes was 0.126 mm², which were smaller than those of the cells 1 to 3. Thus, it was revealed that the discharge capacity of the cell 5 was reduced because of a small amount of air taken into the cell.

(Consideration of Area Ratio of Air Hole or the Like)

Example 2

<Production of Positive Electrode>

A base material for producing a positive electrode similar to that used in Example 1 was punched into a shape including a 15 mm×15 mm main body portion with the catalyst layer and a 5 mm×15 mm terminal portion without the catalyst layer. Thus, a positive electrode (air electrode) with a total thickness of 0.27 mm was produced.

<Production of Negative Electrode>

Zinc alloy foil (rolled foil) similar to that used in Example 1 was punched into a shape including a 15 mm×15 mm main body portion and a 5 mm×15 mm terminal portion. Thus, a negative electrode was produced.

<Sheet-Type Outer Case Member>

A sheet-type outer case member was the same as the outer case member of the aluminum laminated film in Example 1. Circular air holes were previously formed in a plurality of sheet-type outer case members that were to be located on the positive electrode side by using hot needles under the conditions shown in Table 3 so that the air holes were arranged in the manner shown in FIGS. 4(a) to 4(h). The resulting outer case members were referred to as outer case members 6 to 18. These outer case members had a size of 25 mm×25 mm. Like Example 1, the water repellent membrane was thermally fused to the inner surface of each of the outer case members. Moreover, a plurality of sheet-type outer case members that were to be located on the negative electrode side were prepared. These outer case members had a size of 25 mm×25 mm. Like Example 1, the modified polyolefin ionomer film was attached to each of the outer case members.

<Cell Assembly>

Using the outer case members 6 to 18 to be located on the positive electrode side, cells were assembled in the same manner as Example 1 except that the amount of the electrolyte solution was changed to 0.15 ml. Consequently, the sheet-type air cells (cells 6 to 18) were produced, each of which had a total thickness of about 1.2 mm.

TABLE 3

| | Outer case member to be located on positive electrode side | Properties of individual air holes | | | | Arrangement of air holes and center-to-center distance of adjacent air holes | Area ratio (s/t) |
|---|---|---|---|---|---|---|---|
| | | Diameter (mm) | Area (mm²) | Number of air holes | Total area of air holes s (mm²) | | |
| Cell 6 | Outer case member 6 | 0.1 | 0.008 | 9 | 0.071 | 3 (column) × 3 (row) 5 mm × 5 mm | 0.0003 |
| Cell 7 | Outer case member 7 | 0.2 | 0.031 | 4 | 0.126 | 2 (column) × 2 (row) 7.5 mm × 7.5 mm | 0.0006 |
| Cell 8 | Outer case member 8 | | | 9 | 0.283 | 3 (column) × 3 (row) 5 mm × 5 mm | 0.0013 |
| Cell 9 | Outer case member 9 | | | 16 | 0.502 | 4 (column) × 4 (row) 3.8 mm × 3.8 mm | 0.0022 |
| Cell 10 | Outer case member 10 | 0.3 | 0.071 | 2 | 0.141 | 2 (row) 7.5 mm | 0.0006 |
| Cell 11 | Outer case member 11 | | | 3 | 0.212 | 3 (row) 5 mm | 0.0009 |
| Cell 12 | Outer case member 12 | | | 5 | 0.353 | vertices and center of square 5.3 mm | 0.0016 |
| Cell 13 | Outer case member 13 | | | 9 | 0.636 | 3 (column) × 3 (row) 5 mm × 5 mm | 0.0028 |
| Cell 14 | Outer case member 14 | | | 13 | 0.918 | staggered arrangement 3 mm | 0.0041 |
| Cell 15 | Outer case member 15 | 0.5 | 0.196 | 1 | 0.196 | central portion of catalyst layer | 0.0009 |
| Cell 16 | Outer case member 16 | | | 3 | 0.589 | 3 (row) 5 mm | 0.0026 |
| Cell 17 | Outer case member 17 | | | 5 | 0.981 | vertices and center of square 5.3 mm | 0.0044 |
| Cell 18 | Outer case member 18 | | | 9 | 1.766 | 3 (column) × 3 (row) 5 mm × 5 mm | 0.0078 |

The cells 6 to 18 thus produced were evaluated as follows.

[Evaluation of Variation in Cell Characteristic]

Figure 9:
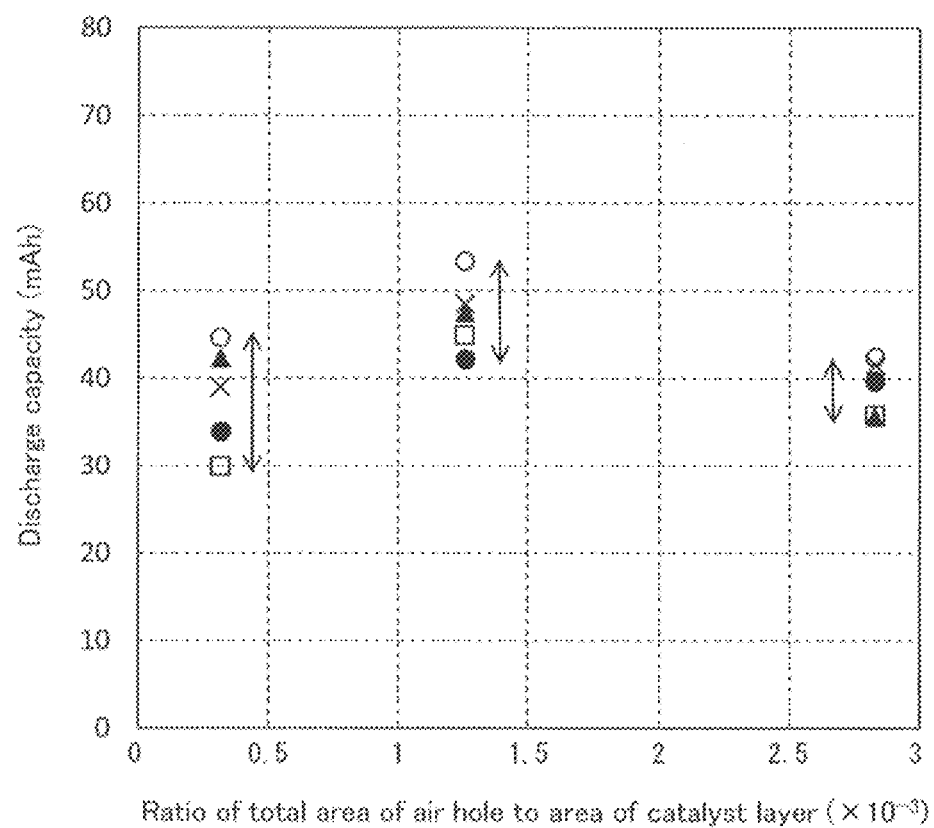
FIG. 9 is a graph showing the relationship between the ratio of the area of air holes and the variation in cell characteristics.

The discharge capacities of five cells were measured under the following conditions with respect to the cell 6 having 9 air holes with a diameter of 0.1 mm (φ 0.1), the cell 8 having 9 air holes with a diameter of 0.2 mm (φ0.2), and the cell 13 having 9 air holes with a diameter of 0.3 mm (φ 0.3). Then, a variation in the cell characteristics was evaluated based on a variation in the discharge capacity for each of the cells 6, 8, and 13. FIG. 9 shows the measured values of the discharge capacities of the individual cells.

Discharge conditions: Each cell was discharged at a current corresponding to 0.1 C (10 hour rate) with respect to the design capacity of the cell, which was calculated from the amount of the active material in the main body portion of the negative electrode, and the discharge capacity was measured until the cell voltage was reduced to 0.6 V.

In the cell 6 having air holes with a diameter of 0.1 mm (area: 0.008 mm$^2$), it was difficult to form uniform air holes in the sheet-type outer case member by the method using hot needles because the area of each air hole was too small. Thus, the discharge capacity of the cell 6 varied, as compared to the cells 8 and 13 in which the area of each air hole was 0.02 mm$^2$ or more (the diameter was 0.16 mm or more). The results confirm that such a variation in the discharge capacity makes it difficult to produce a cell having uniform discharge characteristics.

As described above, the laser irradiation method is suitable for the formulation of much smaller air holes. Therefore, if the air holes in the outer case member of the cell 6 were formed by laser irradiation, it would be possible to suppress the variation in the discharge capacity and to produce a cell having uniform discharge characteristics.

[Evaluation of Discharge Capacity]

Figure 10:
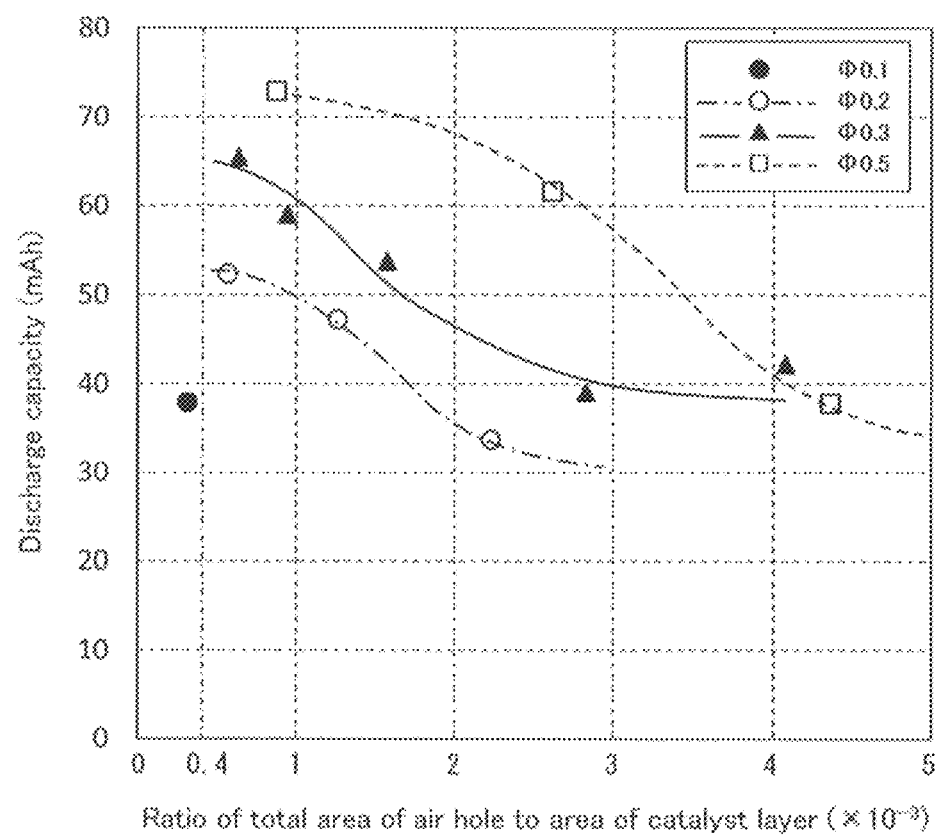
FIG. 10 is a graph showing the relationship between the ratio of the area of air holes and the discharge capacity of a cell.

The discharge capacities of five cells for each of the cells 6 to 17 were measured under the above conditions and the average of the discharge capacities was determined. FIG. 10 shows the results.

The measurement results in FIG. 10 confirm that the discharge capacity of the cell 6 is lower than those of the cells 7, 10, 11, and 15. In the cell 6, the ratio s/t of the total area s of the air holes (mm$^2$) to the area t of the catalyst layer (mm$^2$) is 0.0003. In the cells 7, 10, 11, and 15, the area of each air hole is 0.02 mm$^2$ or more and the ratio s/t is 0.0004 to 0.001. The discharge capacity is expected to be lower as the value s/t becomes smaller. Thus, the value s/t may be preferably 0.0003 or more, and more preferably 0.0004 or more.

The discharge capacity decreases with an increase in the value s/t regardless of the area of each air hole. Moreover, when the value sit is in the range of 0.0004 to 0.002, the discharge capacity can be increased with increasing the area of each air hole as long as a/b is the same value. In other words, when the value s/t is set in the range of 0.0004 to 0.002, the cell can have a discharge capacity at a certain level or higher, and the discharge capacity can be increased with increasing the area of each air hole and reducing the number of the air holes.

[Measurement of Amount of Vaporization of Electrolyte Solution]

Figure 11:
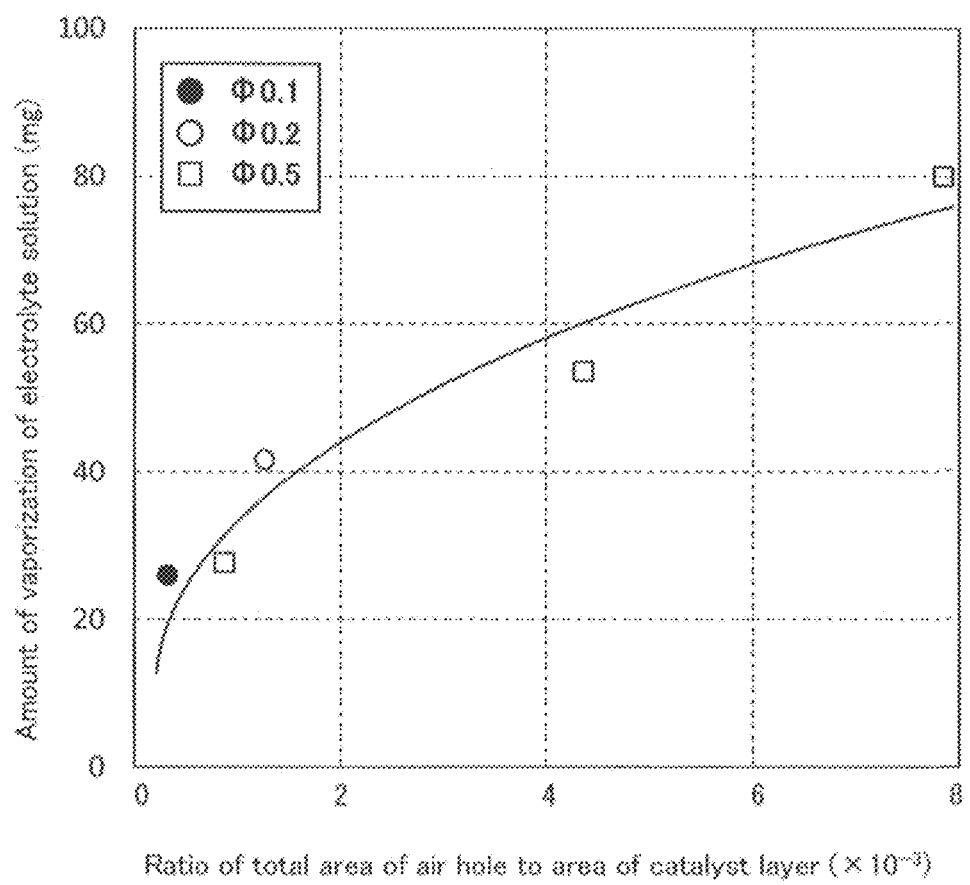
FIG. 11 is a graph showing the relationship between the ratio of the area of air holes and the amount of vaporization of an electrolyte solution.

Three cells for each of the cells 6, 8, 15, 17, and 18 were stored in a thermostat at 40° C. for 24 hours, and then a change in weight between the cell before storage and the cell after storage was measured. FIG. 11 shows the average of the measured values of the cells.

The measurement results in FIG. 11 confirm that the amount of vaporization of the electrolyte solution increases and the long-term storage characteristics of the cell decrease with an increase in the value s/t. When the value s/t is as small as possible, e.g., 0.004 or less, the vaporization of the electrolyte solution can be suppressed, so that the cell can have excellent long-term storage characteristics.

(Evaluation of Outer Case Made of Resin Film Having Electrically Insulating Moisture Barrier Layer)

Example 3

<Production of Positive Electrode>

A composition for forming a catalyst layer was prepared by mixing 75 parts by mass of carbon (Ketjenblack EC600JD (trade name) manufactured by Lion Specialty Chemicals Co., Ltd.) with a DBP oil absorption of 495 cm$^3$/100 g and a specific surface area of 1270 m$^2$/g, 25 parts by mass of an acrylic dispersing agent, and 300 parts by mass of ethanol.

Using porous carbon paper (thickness: 0.25 mm, porosity: 75%, air permeability (Gurley): 70 sec/100 ml) as a current collector, the composition for forming a catalyst layer was applied to the surface of the current collector by stripe coating so that the coating amount after drying was 10 mg/cm$^2$. Then, the composition was dried, resulting in a base material for producing a positive electrode that had a portion in which the catalyst layer was formed and a portion in which no catalyst layer was formed. This base material was punched into a shape including a 15 mm×15 mm main body portion with the catalyst layer and a 5 mm×15 mm terminal portion without the catalyst layer. Thus, a positive electrode (air electrode) with a total thickness of 0.27 mm was produced.

<Production of Negative Electrode>

Zinc alloy foil (rolled foil) containing additional elements of In: 0.05% by mass, Bi: 0.04% by mass, and Al: 0.001% by mass was prepared, and the thickness of the zinc alloy foil was adjusted to 0.05 mm. Then, the zinc alloy foil was punched into a shape including a 15 mm×15 mm main body portion and a 5 mm×15 mm terminal portion. Thus, a negative electrode with a theoretical capacity of about 65 mAh was produced.

<Water Repellent Membrane>

A water repellent membrane was a porous PTFE sheet with a thickness of 100 μm.

<Sheet-Type Outer Case Member>

A sheet-type outer case member was a commercially available laminated film (resin film A, thickness: 87 μm, moisture permeability: 0.6 g/m$^2$·24 h, oxygen permeability: 2 cm$^3$/m$^2$·24 h·MPa) having a structure in which an aluminum oxide vapor-deposited layer and a PET film layer were provided on the outer surface of a nylon film substrate and a polyethylene film layer (heat-sealing resin layer) was provided on the inner surface of the nylon film substrate.

Air holes similar to those of the outer case member 18 in Example 2 were previously formed in the sheet-type outer case member that was to be located on the positive electrode side. The outer case member had a size of 25 mm×25 mm. Like Example 1, the water repellent membrane was thermally fused to the inner surface of the outer case member.

Moreover, a sheet-type outer case member that was to be located on the negative electrode side was prepared. The outer case member had a size of 25 mm×25 mm. Like Example 1, the modified polyolefin ionomer film was attached to the outer case member.

<Cell Assembly>

A cell was assembled in the same manner as Example 2 except that the positive electrode, the negative electrode, and the two sheet-type outer case members thus obtained were used. Consequently, the sheet-type air cell with a total thickness of about 0.8 mm was produced.

Example 4

A sheet-type air cell was produced in the same manner as Example 3 except that the resin film of the sheet-type outer case member was a laminated film (resin film B, thickness: 87 μm, moisture permeability: 0.05 g/m$^2$·24 h, oxygen permeability: 1 cm$^3$/m$^2$·24 h·MPa), which had the same configuration as the resin film A, but differed from the resin film A in moisture permeability and oxygen permeability.

Example 5

A sheet-type air cell was produced in the same manner as Example 3 except that the resin film of the sheet-type outer case member was a laminated film (resin film C, thickness: 87 μm, moisture permeability: 0.2 g/m$^2$·24 h, oxygen permeability: 1 cm$^3$/m$^2$·24 h·MPa) having a structure in which a silicon oxide vapor-deposited layer and a PET film layer were provided on the outer surface of a nylon film substrate and a polyethylene film layer (heat-sealing resin layer) was provided on the inner surface of the nylon film substrate.

Example 6

A sheet-type air cell was produced in the same manner as Example 3 except that the resin film of the sheet-type outer case member was a laminated film (resin film D, thickness: 72 μm, moisture permeability: 0.08 g/m$^2$·24 h, oxygen permeability: 1 cm$^3$/m$^2$·24 h·MPa) having a structure in which a silicon oxide vapor-deposited layer was provided on the outer surface of a PET film substrate and a polyethylene film layer (heat-sealing resin layer) was provided on the inner surface of the PET film substrate.

Example 7

A sheet-type air cell was produced in the same manner as Example 3 except that the resin film of the sheet-type outer case member was a laminated film (resin film E, thickness: 82 μm, moisture permeability: 1.5 g/m$^2$·24 h, oxygen permeability: 15 cm$^3$/m$^2$·24 h·MPa), which had the same configuration as the resin film. A, but differed from the resin film A in moisture permeability and oxygen permeability, and that no air holes were formed in the sheet-type outer case member to be located on the positive electrode side.

Comparative Example 1

A sheet-type air cell was produced in the same manner as Example 3 except that the resin film of the sheet-type outer case member was an aluminum laminated film (resin film F, thickness: 87 μm, moisture permeability: 0.1 g/m$^2$·24 h or less, oxygen permeability: 0.01 cm$^3$/m$^2$·24 h·MPa or less) having a structure in which a PET film layer was provided on the outer surface of aluminum foil and a polyethylene film layer (heat-sealing resin layer) was provided on the inner surface of the aluminum foil.

Comparative Example 2

A sheet-type air cell was produced in the same manner as Example 3 except that the resin film of the sheet-type outer case member was a laminated film (resin film G, thickness: 72 μm) having a structure in which a polyethylene film layer (heat-sealing resin layer) was provided on the inner surface of a PET film substrate.

The moisture permeability of each of the sheet-type outer case members was a value measured by a method in accordance with JIS K 7129B. The oxygen permeability of each of the sheet-type outer case members was a value measured by a method in accordance with JIS K 7126-2. Table 4 shows the results of the measurement of the moisture permeability and the oxygen permeability of the sheet-type outer case members, along with their names and the types of moisture barrier layers.

TABLE 4

| | Sheet-type outer case member | Moisture barrier layer | Moisture permeability (g/m$^2$ · 24 h) | Oxygen permeability (cm$^3$/m$^2$ · 24 h · MPa) |
|---|---|---|---|---|
| Example 3 | resin film A | aluminum oxide | 0.6 | 2 |
| Example 4 | resin film B | aluminum oxide | 0.05 | 1 |
| Example 5 | resin film C | silicon oxide | 0.2 | 1 |
| Example 6 | resin film D | silicon oxide | 0.08 | 1 |
| Example 7 | resin film E | aluminum oxide | 1.5 | 15 |
| Comparative Example 1 | resin film F | aluminum | 0.1 or less | 0.01 or less |
| Comparative Example 2 | resin film G | — | 12 | 300 |

The following measurements were performed on the sheet-type air cells including the sheet-type outer case members of Examples 3 to 7 and Comparative Examples 1 and 2 in order to evaluate the performance of the sheet-type outer case used for each of the cells.

[Evaluation of Insulation Property of Sealed Portion of Sheet-Type Air Cell]

A resistance value between the terminal portion of the sheet-type air cell and the moisture barrier layer of the sheet-type outer case was measured. If the resistance value was 50 MΩ or more, the cell was evaluated as good insulation properties. If the resistance value was less than 50 MΩ, the cell was evaluated as poor insulation properties. Ten cells for each of the Examples and Comparative Examples were measured, and the number of cells with poor insulation properties was examined.

In the sheet-type air cells of Examples 3 to 7, the aluminum oxide vapor-deposited layer or the silicon oxide vapor-deposited layer of the sheet-type outer case member corresponded to the moisture barrier layer. In the sheet-type air cell of Comparative Example 1, the aluminum foil of the sheet-type outer case member corresponded to the moisture barrier layer. The cell of Comparative Example 2 did not have a configuration corresponding to the moisture barrier layer of the sheet-type outer case. Thus, the measurement was performed by assuming that the PET film substrate served as a moisture barrier layer.

[Evaluation of Liquid Retention Ability of Sheet-Type Outer Case]

The air holes of each of the sheet-type air cells were closed with an aluminum foil adhesive tape. The sheet-type air cells were then stored in a thermostat at 60° C. for 30 days. After the sheet-type air cells were taken out, the amount of the electrolyte solution dissipated to the outside of the cell system (i.e., the reduced water content) was determined from the weight loss of each cell before and after storage. The liquid retention ability of the sheet-type outer case was evaluated based on the ratio of the amount of the electrolyte solution dissipated to the amount of the electrolyte solution before storage (i.e., the rate of decrease in the electrolyte solution).

[Evaluation of Storage Capacity of Sheet-Type Air Cell]

Each of the sheet-type air cells was allowed to stand in the environment of 20° C. and 60% RH for 10 minutes, and then discharged at a current corresponding to 0.1 C (10 hour rate). The discharge capacity (capacity before storage) was measured until the cell voltage was reduced to 0.8 V.

Using the sheet-type air cells that were different from the cells for which the discharge characteristics before storage had been measured, the air holes of each of the sheet-type air cells were closed with an aluminum foil adhesive tape. The sheet-type air cells were then stored in a thermostat at 60° C. for 30 days. After the sheet-type air cells were taken out, the aluminum foil adhesive tape was removed in the environment of 20° C. and 60% RH, and the cells were allowed to stand as they were for 10 minutes. Subsequently, each of the cells was discharged at a current corresponding to 0.1 C (10 hour rate). The discharge capacity (capacity after storage) was measured until the cell voltage was reduced to 0.8 V.

The ratio (capacity maintenance rate) of the capacity after storage to the capacity before storage was determined, and the storage characteristics of each of the cells were evaluated.

Table 5 shows the results of the measurement of the insulation properties, the rate of decrease in the electrolyte solution, and the capacity maintenance rate.

TABLE 5

| | Insulation properties Number of defectives/ Total number of cells | Rate of decrease in electrolyte solution (%) | Capacity maintenance rate (%) |
|---|---|---|---|
| Example 3 | 0/10 | 37 | 60 |
| Example 4 | 0/10 | 27 | 62 |
| Example 5 | 0/10 | 9 | 75 |
| Example 6 | 0/10 | 10 | 70 |
| Example 7 | 0/10 | 50 | 60 |
| Comparative Example 1 | 2/10 | 0 | 88 |
| Comparative Example 2 | 0/10 | 80 | 2 |

As shown in Table 5, the sheet-type air cells of Examples 3 to 7, each of which included the sheet-type outer case made of the resin film having the electrically insulating moisture barrier layer (i.e., the aluminum oxide vapor-deposited layer or the silicon oxide vapor-deposited layer), maintained good electrical insulation between the sheet-type outer case and the electrodes, had good storage characteristics due to less dissipation of the electrolyte solution, and thus achieved excellent reliability. In particular, the sheet-type air cells of Examples 5 and 6, in which the silicon oxide vapor-deposited layer was used as the moisture barrier layer of the sheet-type outer case, reduced the dissipation of the electrolyte solution despite a small thickness of the outer case and therefore had better storage characteristics, as compared to the sheet-type air cells of Examples 3 and 4, in which the aluminum oxide vapor-deposited layer was used as the moisture barrier layer of the sheet-type outer case.

On the other hand, the sheet-type air cell of Comparative Example 1, which included the sheet-type outer case having the aluminum layer as the moisture barrier layer, caused poor electrical insulation between the sheet-type outer case and the electrodes. Moreover, the sheet-type air cell of Comparative Example 2, which included the sheet-type outer case having no moisture barrier layer, increased the dissipation of the electrolyte solution and therefore had poor storage characteristics.

The sheet-type air cell of Example 7, which included the sheet-type outer case having the resin film with high oxygen permeability, did not have air holes in the outer case, but was able to supply oxygen into the cell to some extent through the outer case with high oxygen permeability. Thus, the sheet-type air cell could be operated for a certain period of time if it was discharged at a relatively low rate.

DESCRIPTION OF REFERENCE NUMERALS

10 Sheet-type air cell
1 Positive electrode (air electrode)
1a Terminal of positive electrode
2 Negative electrode
2a Terminal of negative electrode
3 Separator
4 Water repellent membrane
5 Sheet-type outer case
6 Air hole

The invention claimed is:

1. A sheet-type cell comprising:
power generation elements, including a positive electrode, a negative electrode, a separator, and an electrolyte solution; and
a sheet-type outer case made of a resin film in which the power generation elements are contained,
wherein the electrolyte solution is an aqueous electrolyte solution with a pH of 3 or more and less than 12,
the negative electrode includes an active material composed of a zinc alloy,
the resin film has an electrically insulating moisture barrier layer, and
the resin film has an electrically insulating moisture barrier layer, composed of at least an inorganic oxide, and
the sheet-type cell is a primary cell.

2. The sheet-type cell according to claim 1, wherein a moisture permeability of the resin film is 10 g/m$^2$·24 h or less.

3. The sheet-type cell according to claim 1, wherein an oxygen permeability of the resin film is 0.02 to 100 cm$^3$/m$^2$·24 h·MPa.

4. The sheet-type cell according to claim 1, wherein a thickness of the resin film is 10 to 200 μm.

5. The sheet-type cell according to claim 1, having a thickness of 1.5 mm or less.

6. The sheet-type cell according to claim 1, wherein the positive electrode has a catalyst layer containing a catalyst, and
one or more air holes are formed in a side of the outer case where the positive electrode is provided.

7. A wearable patch that is attached to a body, comprising:
the sheet-type cell according to claim 1 as a power source.

8. The sheet-type cell according to claim 1, wherein the moisture barrier layer of the sheet-type outer case does not include a metal layer.

9. The sheet-type cell according to claim 1, wherein the active material of the negative electrode is zinc alloy foil.

10. The sheet-type cell according to claim 9, wherein the zinc alloy foil is electrolytic foil.

11. The sheet-type cell according to claim 9, wherein the zinc alloy foil contains bismuth.

12. The sheet-type cell according to claim 9, wherein a part of the zinc alloy foil forms a terminal of the negative electrode.

13. The sheet-type cell according to claim 1, wherein the positive electrode includes a porous carbon base material as a current collector.

14. The sheet-type cell according to claim 13, wherein a part of the porous carbon base material forms a terminal of the positive electrode.

15. The sheet-type cell according to claim 1, wherein the aqueous electrolyte solution contains, as an electrolyte salt, a salt of a strong acid and a weak base, and the strong acid is selected from a hydrochloric acid, a sulfuric acid, and a nitric acid.

16. A sheet-type cell that is an air cell, comprising:
power generation elements, including a positive electrode, a negative electrode, a separator, and an electrolyte solution; and
a sheet-type outer case made of a resin film in which the power generation elements are contained, the resin film has an electrically insulating moisture barrier layer, wherein the positive electrode is located on one side of the outer case and the negative electrode is located on the other side of the outer case,
the positive electrode has a catalyst layer containing a catalyst,
one or more air holes are formed in the side of the outer case where the positive electrode is provided,
each air hole has an area of 0.002 mm$^2$ or more, and
the sheet-type cell satisfies $0.0002 \leq s/t \leq 0.03$, where s represents a total area (mm$^2$) of the one or more air holes and t represents an area (mm$^2$) of the catalyst layer.

17. A wearable patch that is attached to a body, comprising:
the sheet-type cell according to claim 16 a power source.

18. The sheet-type cell according to claim 16, wherein the moisture barrier layer of the sheet-type outer case does not include a metal layer.

* * * * *